United States Patent
El Kolli et al.

(10) Patent No.: US 10,757,329 B2
(45) Date of Patent: Aug. 25, 2020

(54) POWER MANAGEMENT MODULE AND METHOD FOR MANAGING POWER SUPPLY

(71) Applicant: CANON KABUSHIKI KAISHA, Tokyo (JP)

(72) Inventors: Yacine El Kolli, Rennes (FR); Pascal LaGrange, La Chapelle des Fougeretz (FR); Hervé Merlet, Servon-sur-Vilaine (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/094,838

(22) PCT Filed: Apr. 19, 2017

(86) PCT No.: PCT/EP2017/059244
§ 371 (c)(1),
(2) Date: Oct. 18, 2018

(87) PCT Pub. No.: WO2017/182499
PCT Pub. Date: Oct. 26, 2017

(65) Prior Publication Data
US 2019/0124262 A1 Apr. 25, 2019

(30) Foreign Application Priority Data

Apr. 22, 2016 (GB) .................................. 1607059.1

(51) Int. Cl.
*H04N 5/232* (2006.01)
*G08B 13/196* (2006.01)
(Continued)

(52) U.S. Cl.
CPC ... *H04N 5/23241* (2013.01); *G08B 13/19617* (2013.01); *H04L 12/10* (2013.01);
(Continued)

(58) Field of Classification Search
None
See application file for complete search history.

(56) References Cited

U.S. PATENT DOCUMENTS

2006/0080573 A1   4/2006   Biederman
2006/0082222 A1   4/2006   Pincu
(Continued)

*Primary Examiner* — Christopher Braniff
(74) *Attorney, Agent, or Firm* — Canon U.S.A., Inc. IP Division

(57) ABSTRACT

A power management module for managing power supply from a power sourcing equipment item to an associated apparatus, which includes a connexion interface suitable for connecting the power management module to the associated apparatus for estimating a power that the power management module is able to supply via the connexion interface, negotiating, based on the power estimated by the means for estimating power, the start-up of the associated apparatus in a power class, the means for negotiating comprising means for supplying power via the connexion interface, determining an updated power that the power management module is able to supply, when power is supplied to the associated apparatus by said means for supplying power, and re-negotiating the start-up of the associated apparatus based on the determined updated power.

18 Claims, 19 Drawing Sheets

(51) Int. Cl.
  *H04L 12/10* (2006.01)
  *H04N 7/18* (2006.01)
  *H04L 12/40* (2006.01)

(52) U.S. Cl.
  CPC ....... *H04L 12/40045* (2013.01); *H04N 7/181* (2013.01); *G08B 13/19636* (2013.01)

(56) References Cited

U.S. PATENT DOCUMENTS

2008/0052546 A1\* 2/2008 Schindler ................ G06F 1/266
  713/300
2013/0013949 A1\* 1/2013 Mohammed ............ G06F 1/266
  713/340

\* cited by examiner

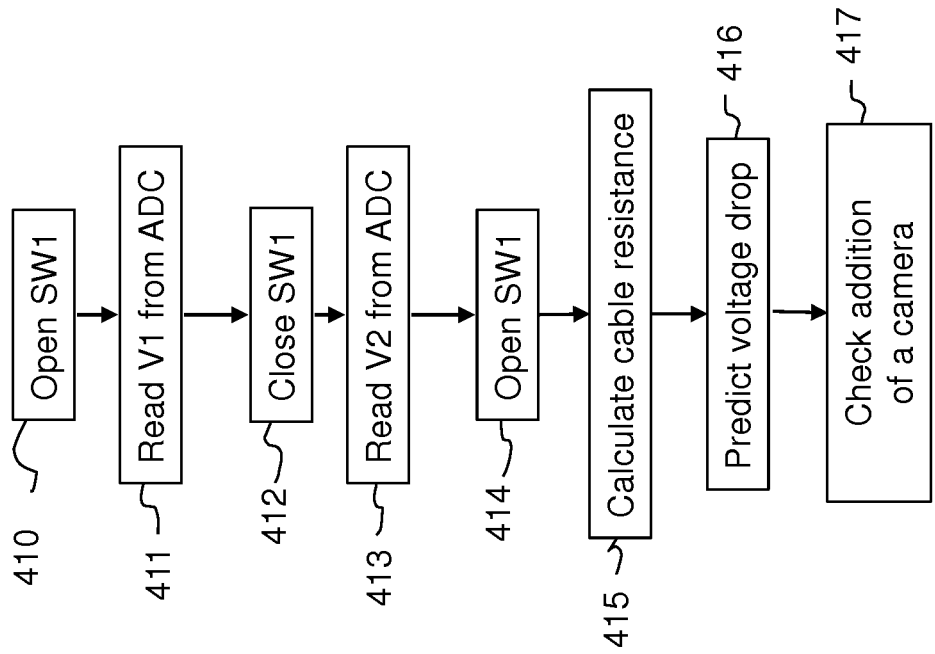
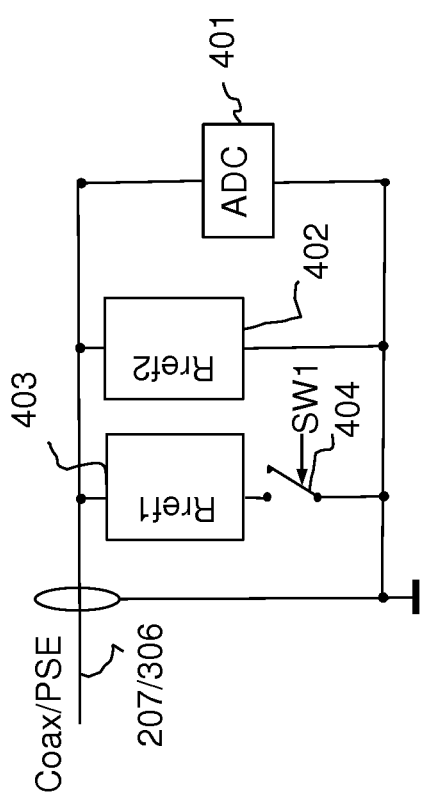
Fig. 4b
Fig. 4a

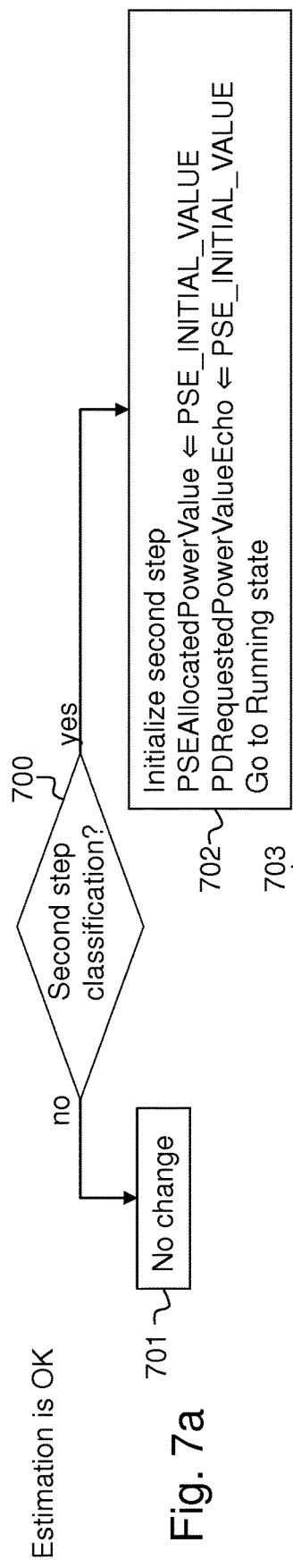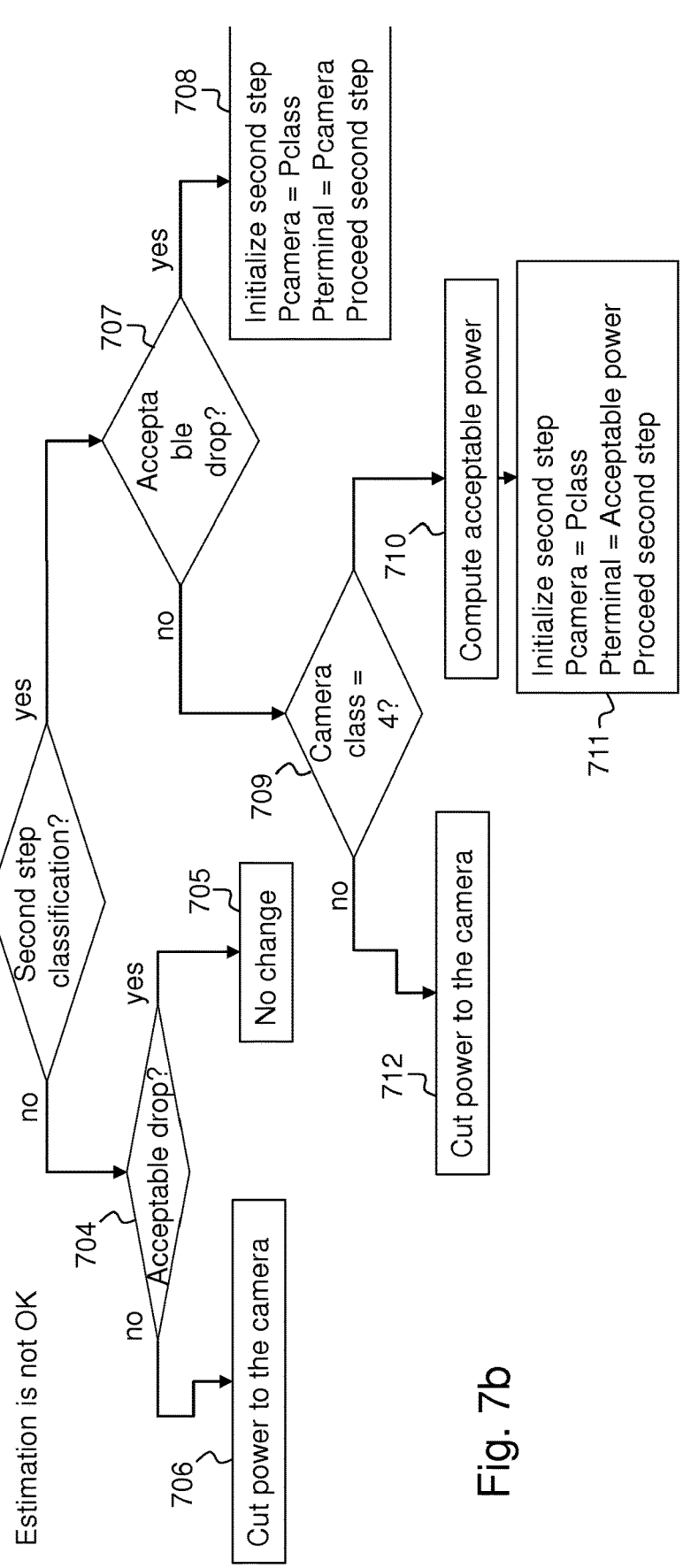

POWER MANAGEMENT MODULE AND METHOD FOR MANAGING POWER SUPPLY

CROSS REFERENCE TO RELATED APPLICATIONS

This application claims the benefit under 35 U.S.C. § 119(a)-(d) of United Kingdom Patent Application No. 1607059.1, filed on Apr. 22, 2016 and entitled "Power management module and method for managing power supply". The above cited patent application is incorporated herein by reference in its entirety.

FIELD OF THE DISCLOSURE

The present invention relates to a power management module for managing power supply from a power source to an apparatus.

In particular, the invention relates to a power management module associated with an apparatus in a power over data network. The apparatus is for example a digital camera, such as an IP camera.

The invention has a particular application in digital video surveillance systems, in either new digital video surveillance systems or in retrofitted analogue video surveillance systems.

BACKGROUND

A typical digital video surveillance system comprises at least two types of wire networks, a first type of wire network for data transport, and a second type of wire network for power distribution to digital cameras in the system.

It may be useful, for example for saving costs, to use a same wire infrastructure able to distribute both data and power.

Technologies which allow both data and power to be carried over a same wire are known as "Power over Ethernet" (PoE) technologies. These technologies allow power distribution and Ethernet data to be mixed on one cable.

It is advantageous, in terms of cost among others, to build a new digital camera surveillance infrastructure by using LAN wires which are able to support power distribution.

Moreover, an analogue camera surveillance system may be upgraded in order to build a digital video surveillance system. Some analogue camera surveillance systems use for example coaxial cables to transport data from the analogue cameras to a central point. Some technologies, such as IP over Coax technologies, allow transport of both data and power over existing analogue video distribution cable networks, such as Coaxial or copper pair wire networks.

An analogue camera surveillance system is upgraded or retrofitted in order to build a digital camera surveillance system by replacing analogue cameras by digital network cameras, for example IP cameras, and by inserting an adapter, both at the central point and at each digital camera, the analogue cable infrastructure being reused.

In a retrofit digital video surveillance system, the central point is connected to an Ethernet infrastructure (for example a LAN) and to a plurality of digital cameras through coaxial cables.

The adapter in the central point converts data originating from the Ethernet infrastructure to data adapted to be transported by the coaxial cables ("IP Coax Traffic") and sends it to the digital cameras (such as "IP Coax cameras"), converts data originating from digital cameras to data adapted to be transported by the Ethernet infrastructure ("Ethernet Traffic") and sends it to the LAN, and provides power to the IP cameras over the coaxial cables.

The adapter in the camera ("Coax terminal adapter") is connected to an Ethernet port of the camera. The "Coax terminal adapter" converts IP Coax traffic originating from the Coaxial cable to Ethernet traffic and sends it to the camera, converts Ethernet traffic originating from the camera to IP Coax Traffic and sends it to the Coaxial cable, and receives power from the Coaxial cable and delivers it to the camera through the Ethernet port.

In these technologies, the Coax terminal adapter comprises a power management module configured for managing the power distribution to the camera. In particular, the power management module is configured for delivering power to the camera following standards for power transport over Ethernet known as PoE (IEEE802.3af) or PoE+ (IEEE802.3at).

By implementing these standards a power source device or item of power sourcing equipment (PSE), does not deliver power to a non-compatible power sink device (PD). Furthermore, a power source device only delivers power to a compatible power sink device, if it is able to provide the amount of power needed by the power sink device.

Thus, a Coax terminal adapter (in particular the power management module) determines whether the camera is compatible with PoE standards, and if the response is positive, it determines the maximum power consumption of the camera or camera power class. According to PoE standards, the power management module only delivers power to the camera if the camera is compatible with PoE standards and if the power management module is able to deliver the maximum power consumed by the camera, i.e. that the camera may be started-up in its power class.

For example, document US2010/0031066 describes a system for determining a class of power delivered by an item of power sourcing equipment (PSE) using Power over Ethernet technology, in order to find the maximum power that can be provided by the PSE.

The determination of power supplied by a PSE to an apparatus is a delicate operation since when providing an apparatus with a power lower than the required power, the voltage applied to the apparatus may be too low and the apparatus may be damaged by too high a current.

The present invention is directed to providing an improved power management module for managing power supply to an apparatus, making it possible to enhance the prevention of damaging an apparatus powered up by the power management module.

SUMMARY

To that end, according to a first aspect, the present invention concerns a power management module for managing power supply from a power sourcing equipment item to an associated apparatus, comprising:
  a connexion interface suitable for connecting said power management module to the associated apparatus;
  means for estimating a power that said power management module is able to supply via said connexion interface;
  means for negotiating, based on the power estimated by said means for estimating power, the start-up of the associated apparatus in a power class, said means for negotiating comprising means for supplying power via said connexion interface;

means for determining an updated power that said power management module is able to supply, when power is supplied to the associated apparatus by said means for supplying power; and means for re-negotiating the start-up of the associated apparatus based on said determined updated power.

Indeed, when power is supplied by the power management module, the voltage applied to the apparatus suffers a voltage drop that may cause a high current in the apparatus, and the apparatus may be damaged if the high current persists.

By virtue of the preceding features, the power management module determine an updated power when the power is supplied to the apparatus, the updated power taking into account the voltage drop suffered when the power is supplied to the apparatus.

Thus, reviewing the start-up of the apparatus based on the determined updated power avoids supplying power by applying voltages that may cause damage to the apparatus.

According to a feature, the means for negotiating the start-up of the associated apparatus are configured, based on the estimated power:

to supply power to the associated apparatus by said means for supplying power, or not to supply power to the associated apparatus.

Thus, the means for negotiating the start-up of the apparatus may command to supply power or not to supply power to an apparatus depending on the estimated power that the power management module is able to supply and the power class of the apparatus.

According to a feature, the means for negotiating the start-up of the associated apparatus is configured to supply power to the associated apparatus when the estimated power is equal to or greater than a predetermined power associated with the power class of the associated apparatus and not to supply power to the associated apparatus when the estimated power is lower than the predetermined power associated with the power class of the associated apparatus.

According to another feature, the means for re-negotiating the start-up of the apparatus is configured to, based on the determined updated power, not to supply power to the associated apparatus, or to update power allocated for starting-up the associated apparatus in a power class with the determined updated power, or to continue supplying power to the associated apparatus.

According to another feature, the means for re-negotiating the start-up of the associated apparatus is configured, based on the determined updated power, not to supply power to the associated apparatus or to update the allocated power for starting-up the associated apparatus in a power class with the determined updated power, when the determined updated power is lower than the estimated power, and to command to continue supplying power when the determined updated power is similar to the estimated power.

According to a feature, the means for estimating a power comprises means for predicting a voltage drop at the power management module based on the power class of the associated apparatus and on a voltage drop occurring between said power sourcing equipment and said connexion interface.

Thus, the predicted voltage drop is taken into account by the means for estimating power that the power management module is able to supply.

According to a feature, the power management module further comprises sensing means for estimating a resistance value, the voltage drop between a power sourcing equipment item and the connexion interface depending on the estimated resistance value.

According to a feature, the means for determining an updated power comprises means for measuring a voltage drop occurring between the power source and the connexion interface once the estimated power is supplied to the apparatus.

Thus, the means for measuring measures the voltage drop occurring when the estimated power is supplied.

According to a feature, the means for re-negotiating the start-up of the apparatus comprises means for comparing the predicted voltage drop and the measured voltage drop.

Thus, as a function of the result of comparison, the start-up of the apparatus is reviewed.

According to another feature, the power management module further comprises means for requesting power to the power sourcing equipment, in order to start-up the associated apparatus in a power class.

According to another feature, the means for determining an updated power comprises means for measuring a voltage drop occurring when power is supplied to the associated apparatus.

According to a feature, the means for measuring a voltage drop occurring when power is supplied to the associated apparatus are configured, based on the type of associated apparatus, to monitor the voltage drop at the power management module during a predetermined period of time, or to measure the voltage drop at the power management module when a maximum power associated with the power class of the associated apparatus is supplied to the associated apparatus.

In the first case, the power management module does not know if the associated apparatus is functioning at a maximum power and thus the voltage drop at the power management module is monitored during a predetermined period of time. In the second case, the camera is functioning at a maximum power (by request) and as a consequence, the voltage drop may be measured when the associated apparatus is consuming the maximum power.

According to an embodiment, the power management module further comprises means for requesting the associated apparatus to consume the maximum power associated with the power class.

According to a feature, the power management module further comprises means for detecting the presence of an external power source available for providing power.

According to a feature, when the presence of an external power source available for providing power is detected, power originating from the external power source is provided to the associated apparatus.

According to a feature, the means for detecting the presence of an external power source comprise a power sensor.

According to a second aspect, the present invention concerns an adapter device associated to an apparatus, comprising a power management module according to the invention.

According to a third aspect, the present invention concerns a camera device comprising an adapter device according to the invention, the camera device being the apparatus.

According to a fourth aspect, the present invention concerns a system comprising a plurality of camera devices and a plurality of adapter devices, each camera device being associated to an adapter device, wherein each adapter device comprises a power management module according to the invention for managing power supply to an associated camera device from a power source in a power over data network, said network being a video surveillance network.

According to a fifth aspect, the present invention concerns a method for managing power supply from a power source to an apparatus.

The method comprises:
estimating a power that a power management module is able to supply via a connexion interface;
negotiating, based on the estimated power, the start-up of an apparatus in a power class, the negotiating comprising supplying or not power to the associated apparatus via the connexion interface;
determining an updated power that said power management module is able to supply, when power is supplied via the connexion interface; and
re-negotiating the start-up of the apparatus based on said determined updated power.

According to a feature, negotiating the start-up of the associated apparatus comprises, based on the estimated power:
supply power to the associated apparatus, or
not supplying power to the associated apparatus.

According to a feature, negotiating the start-up of the associated apparatus comprises:
supplying power to the associated apparatus when the estimated power is equal to or greater than a predetermined power associated with the power class of the associated apparatus; and
not supplying power to the associated apparatus when the estimated power is lower than the predetermined power associated with the power class of the associated apparatus.

According to a feature, re-negotiating the start-up of the apparatus comprises, based on the determined updated power:
not supplying power to the associated apparatus, or
updating power allocated for starting-up the associated apparatus in a power class with the determined updated power, or
continuing to supply power to the associated apparatus.

According to another feature, re-negotiating the start-up of the apparatus comprises:
updating power allocated for starting-up the associated apparatus in a power class with the determined updated power, or not supplying power to the associated apparatus, when the determined updated power is lower than the estimated power; and
continuing to supply power when the determined updated power is similar to the estimated power.

According to a feature, estimating a power comprises predicting a voltage drop at the power management module based on the power class of the apparatus associated with the power management module and on a voltage drop between said power sourcing equipment and said connexion interface.

According to a feature, the method for managing power further comprises estimating a resistance value, the voltage drop between a power sourcing equipment item and the connexion interface depending on the estimated resistance value.

According to a feature, determining an updated power comprises measuring a voltage drop between the power sourcing equipment and the connexion interface when power is supplied to the associated apparatus.

According to a feature, re-negotiating the start-up of the associated apparatus comprises comparing the predicted voltage drop at the power management module and the measured voltage drop.

According to a feature, the method for managing power further comprises requesting power from the power sourcing equipment, in order to start-up the associated apparatus in a power class.

According to a feature, determining an updated power comprises measuring a voltage drop occurring at the power management module when power is supplied to the associated apparatus.

According to a feature, measuring a voltage drop occurring at the power management module when power is supplied to the associated apparatus comprises, based on the type of apparatus, monitoring the voltage drop at the power management module during a predetermined period of time, or measuring the voltage drop at the power management module when a maximum power associated with the power class of the associated apparatus is supplied to the associated apparatus.

According to an embodiment, the method for managing power further comprises requesting the associated apparatus to consume the maximum power associated with the power class of the associated apparatus.

According to a feature, the method for managing power further comprises detecting the presence of an external power source available for providing power.

According to a feature, when the presence of an external power source available for providing power is detected, power originating from the external power source is provided to the associated apparatus.

Thus, when the presence of an external power source available for providing power is detected, the associated apparatus is powered by the external power source.

Otherwise, when the presence of an external power source available for providing power is not detected, steps of estimating a power that a power management module is able to supply via a connexion interface, negotiating, the start-up of an apparatus in a power class, determining an updated power, and re-negotiating the start-up of the apparatus, are implemented.

According to a sixth aspect of the invention there is provided a means for storing information which can be read by a computer or a microprocessor holding instructions of a computer program, for implementing a method for managing power according to the invention, when said information is read by said computer or said microprocessor.

The means for storing information may be partially or totally removable.

According to a seventh aspect of the invention there is provided a computer program product which can be loaded into a programmable apparatus, comprising a sequence of instructions for implementing a method for managing power according to the invention, when said computer program product is loaded into and executed by said programmable apparatus.

The objects according to the second, third, fourth, fifth, sixth and seventh aspects of the invention provide at least the same advantages as those provided by the power management module according to the first aspect.

BRIEF DESCRIPTION OF THE DRAWINGS

Still other particularities and advantages of the invention will appear in the following description, made with reference to the accompanying drawings which are given by way of non-limiting example, and in which:

FIG. 3a represents a functional block diagram of the power management module of a terminal adapter according to the embodiment represented by FIG. 2a;

FIG. 4a represents a functional block diagram of a power sensor according to an embodiment;

FIG. 4b illustrates a flow chart representing steps for power diagnosis;

FIGS. 7a and 7b represents respectively a flow chart representing an example of implementation of steps 509 and 510 of FIG. 5;

FIG. 14a represents a functional block diagram of the power management module of a terminal adapter according to the embodiment represented by FIG. 13a;

DETAILED DESCRIPTION

Figure 1:
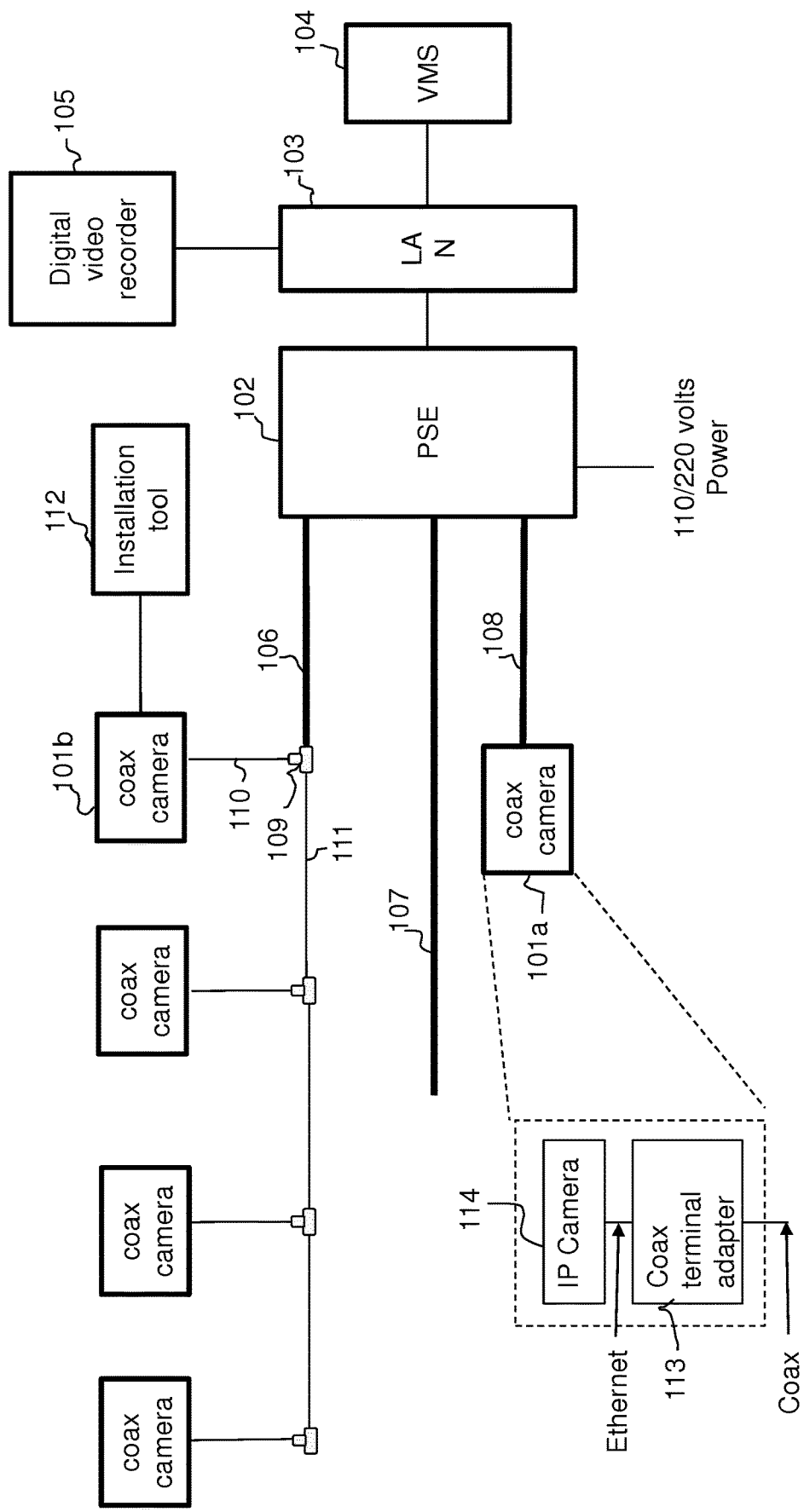
FIG. 1 represents a functional description of a typical video surveillance system as targeted by the invention.

FIG. 1 schematically illustrates an IP over Coax video surveillance system according to embodiments. In particular, FIG. 1 represents a general retrofitted digital video surveillance system according to an embodiment. For example, the retrofitted digital video surveillance system is an analogue video surveillance system that has been upgraded to transport IP (Internet Protocol) data. The analogue cameras of the analogue video surveillance system have been replaced by IP cameras 101. However, the wire infrastructure is kept. The wire infrastructure comprises cables 106,107,108 connecting a central point of the system infrastructure 102 and the cameras 101a, 101b.

It may be noted that cables 106, 107 108 were used in the previous analogue system to transport analogue video signals. In the retrofitted system these cables 106, 107, 108 are used to transport IP video, control data and power supply. These cables are typically as long as required. In the described example, these cables 106, 107, 108 are coaxial cables and may be for example 300 meters long. However, any other type of cables adapted to the transport of analogue video and of any other length may be used.

At a central point 102 of the system infrastructure, an item of equipment called "Head-end adapter" or "IP over Coax receiver" or "Power sourcing equipment (PSE)" 102 connects the cables 106, 107, 108 to a LAN infrastructure 103. The PSE 102 provides power to the cables 106, 107, 108. The PSE encapsulates uplink IP LAN traffic received from its LAN interface (not illustrated) into packets suitable for digital data transport on coaxial cables such as the Home-Plug AV protocol, and sends them on the coaxial cables. The PSE 102 also extracts IP LAN traffic from packets received on downlink coaxial interfaces (not illustrated) and forwards them to the LAN interface. For example, the PSE may be a TBus model (NV-ER1804) of the company NVT.

The coaxial cables 106, 107, 108 can be used either to connect one or several cameras 101a, 101b. For example, a first camera 101a is directly connected to a first coaxial cable 108, a second camera 101b is connected to a second coaxial cable 106 by a T-style connector 109. T-style connectors can be used for increasing the number of cameras connected to a same coaxial cable. In the represented example, one camera 101a is connected to the first cable 108 and four cameras 101b are connected to the same second cable 106. The cameras 101a, 101b will be described with reference to the FIG. 2.

In the described embodiment, cameras 101a, 101b are coaxial cameras, each comprising an IP camera 114 (for example a model VBH-730 of the company Canon) connected by an Ethernet cable to a terminal adapter 113. Typically the terminal adapter 113 is a coaxial terminal adapter.

The LAN infrastructure 103 comprises the necessary switches, routers and gateways that are necessary to transport the IP video to a Video Monitoring System (VMS) 104 and to a digital video recorder 105.

The VMS 104 is configured to display the IP video streams for the purpose of surveillance. Also, the VMS 104 may display power diagnosis information from the cameras 101a, 101b when the information is included in the IP video stream sent by the camera, this information being considered as part of the OSD (from "On Screen Display") data.

A digital video recorder device 105 is configured to record the IP video stream, for example for later play back.

An installation tool 112 is configured to configure the cameras 101a, 101b. The installation tool 112 may be either a mobile or a hand-held device for configuring the cameras 101a, 101b "in-situ". In the described embodiment, the installation tool 112 is also configured to display power diagnosis information.

As will be described with reference to FIG. 10, a power diagnosis report packet is sent by the terminal adapter 113 to the camera 114, the VMS 104 and/or the installation tool 112.

For example, the installation tool 112 is an IT-5000 model of the company Razberi.

Two embodiments of a terminal adapter 113 are described with reference to FIGS. 2a and 2b.

Figure 2A:
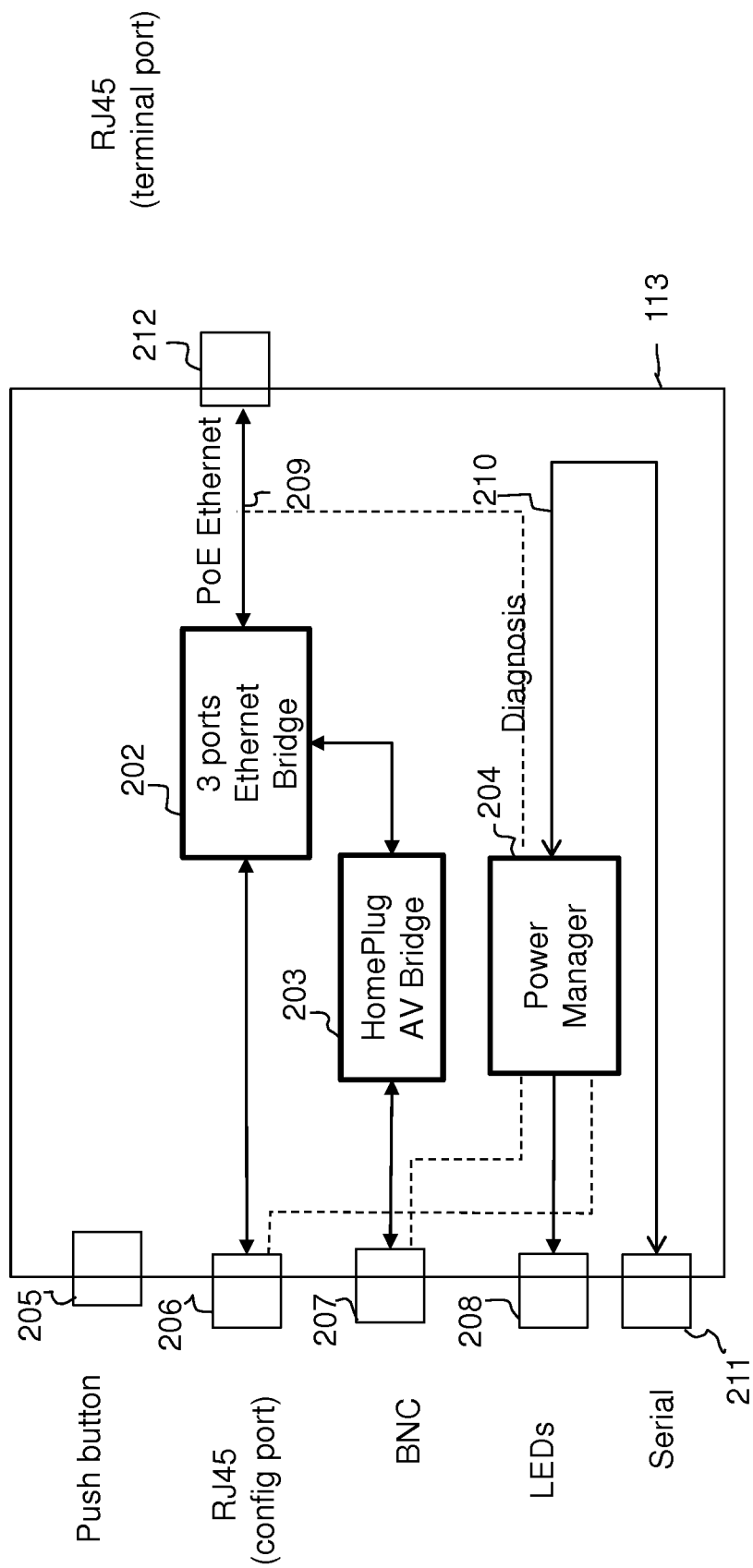
FIGS. 2a et 2b represent respectively a functional block diagram of a terminal adapter according to one embodiment.

A first embodiment of a terminal adapter is represented by FIG. 2a. According to this embodiment, the terminal adapter 113 is connected to the IP camera 114 through an Ethernet communication link 209 and is configured to implement functions of Ethernet transport over coaxial cable and power management. As will be described, the terminal adapter 113 is configured to implement power sensing, voltage drop estimation and correction of the estimated voltage drop.

In the represented embodiment, the terminal adapter 113 comprises a first RJ45 port 206 which is used for camera setup purposes and for detailed power diagnosis result display, a BNC port 207 which is used for IP communication over a coaxial cable, and a second RJ45 port 212 for connecting the IP camera 114.

The terminal adapter 113 further comprises a push button 205 for resetting the terminal adapter 113, a LED set 208 for displaying power diagnosis results, and a serial connector 211. The serial connector 211 may be used for sending power diagnosis information to an external device, such as the installation tool 112, connected to the terminal adapter 113 through the serial connector 211.

The terminal adapter 113 comprises a HomePlug AV bridge 203 which is configured to encapsulate the Camera IP traffic into HomePlug AV packets and to send them on the coaxial cable through the BNC port 207. The HomePlug AV bridge 203 is also configured to extract IP traffic from the received HomePlug AV packets and to forward this extracted IP traffic to the IP camera 114. An example of HomePlug AV bridge 203 is the dLAN 200 AV module (INT6400) of the company Devolo.

The terminal adapter 113 further comprises an Ethernet bridge 202 which is configured to mix IP traffic from the first RJ45 port 206, the HomePlug AV bridge 203 and the second RJ45 port 212 (i.e. from the IP camera 114).

The terminal adapter 113 further comprises a power management module 204 or power manager module configured for managing the power distribution to the camera 114. The power management module 204 receives power from the BNC port 207 and/or from the first RJ45 port 206 and distributes the power to the camera 114, to the homePlug AV bridge 203 and to the Ethernet bridge 202. The power management module 204 distributes the power according to PoE standards. The power management module 204 is detailed in FIG. 3.

It may be noted that the power flow is represented by dashed lines in this Figure.

In the described embodiment, the power management module 204 may communicate data, through a serial line 210 and the serial connector 211, with an external device. The external device may be for example the installation tool 112, the power diagnosis information may be sent to such an external device.

As will be described with reference to FIG. 10, a power diagnosis report packet is sent by the terminal adapter 113 to the installation tool 112.

In the described embodiment, the terminal adapter 113 and the IP camera 114 are two different items of equipment.

According to another embodiment, the terminal adapter may be embedded in the camera.

Figure 2B:
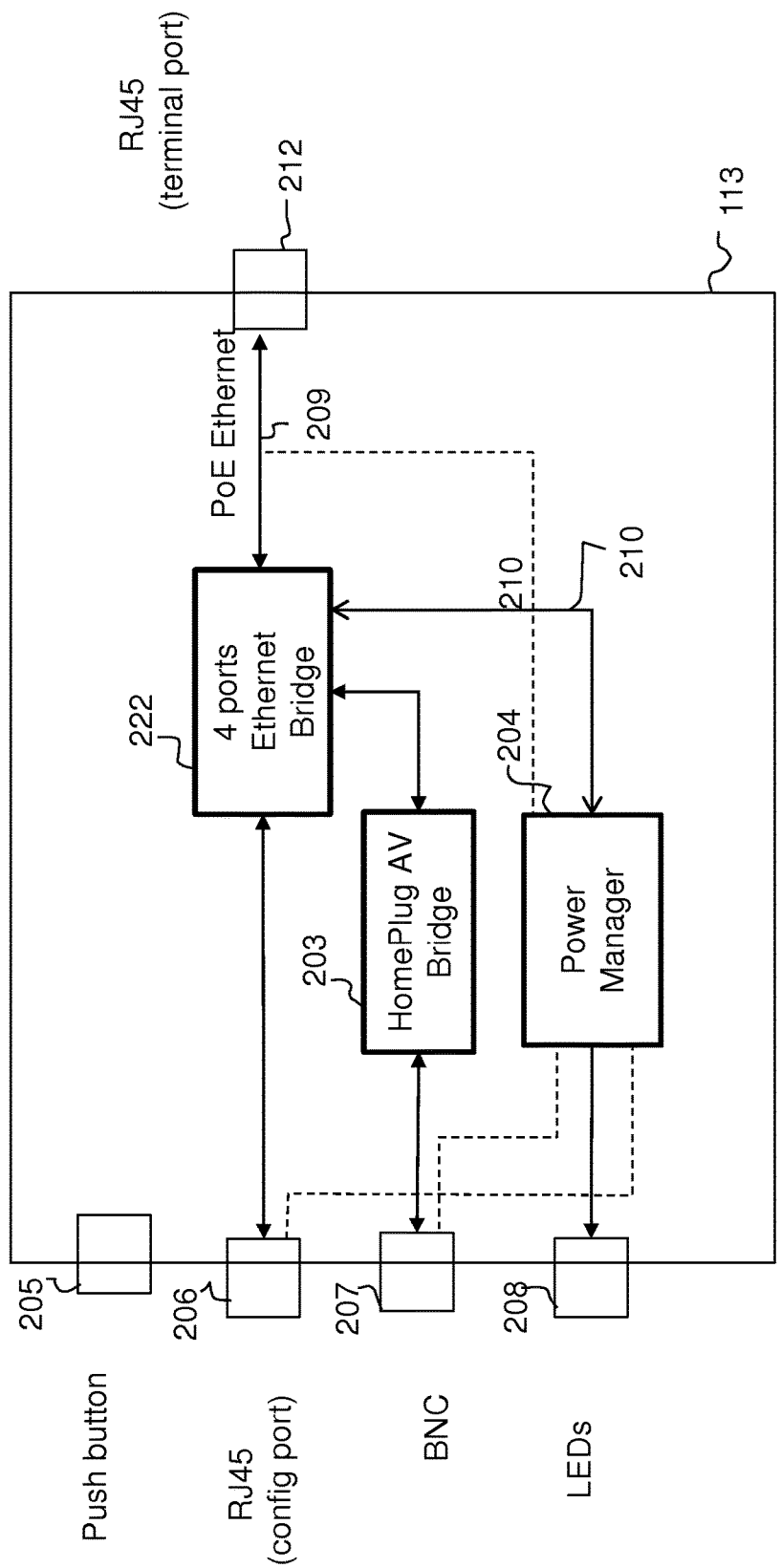

A terminal adapter 113 according to a second embodiment is represented by FIG. 2b. As for the first embodiment, the terminal adapter 113 is connected to the IP camera 114 through an Ethernet communication link 209 and is configured to implement functions of Ethernet transport over coaxial cable and power management. As will be described, the terminal adapter 113 is configured to implement power sensing, voltage drop estimation and correction of the estimated voltage drop.

The terminal adapter 113 according to the second embodiment is also configured to communicate with the PSE 102 and to negotiate the power the PSE 102 supplies to the camera. Thus, the terminal adapter 113 according to this embodiment comprises means for performing the second step of the PoE+ device classification.

The terminal adapter 113 according to the second embodiment is similar to the terminal adapter 113 according to the first embodiment (FIG. 2a) wherein the three-port Ethernet Bridge 202 is replaced by a four-port Ethernet bridge 222. Also, the power management module 204 in the terminal adapter 113 according to the second embodiment communicates by Ethernet with either the camera or with the PSE 102.

Except for the above differences, the description given with reference to FIG. 2a applies to the terminal adapter 113 represented by FIG. 2b.

Figure 3A:
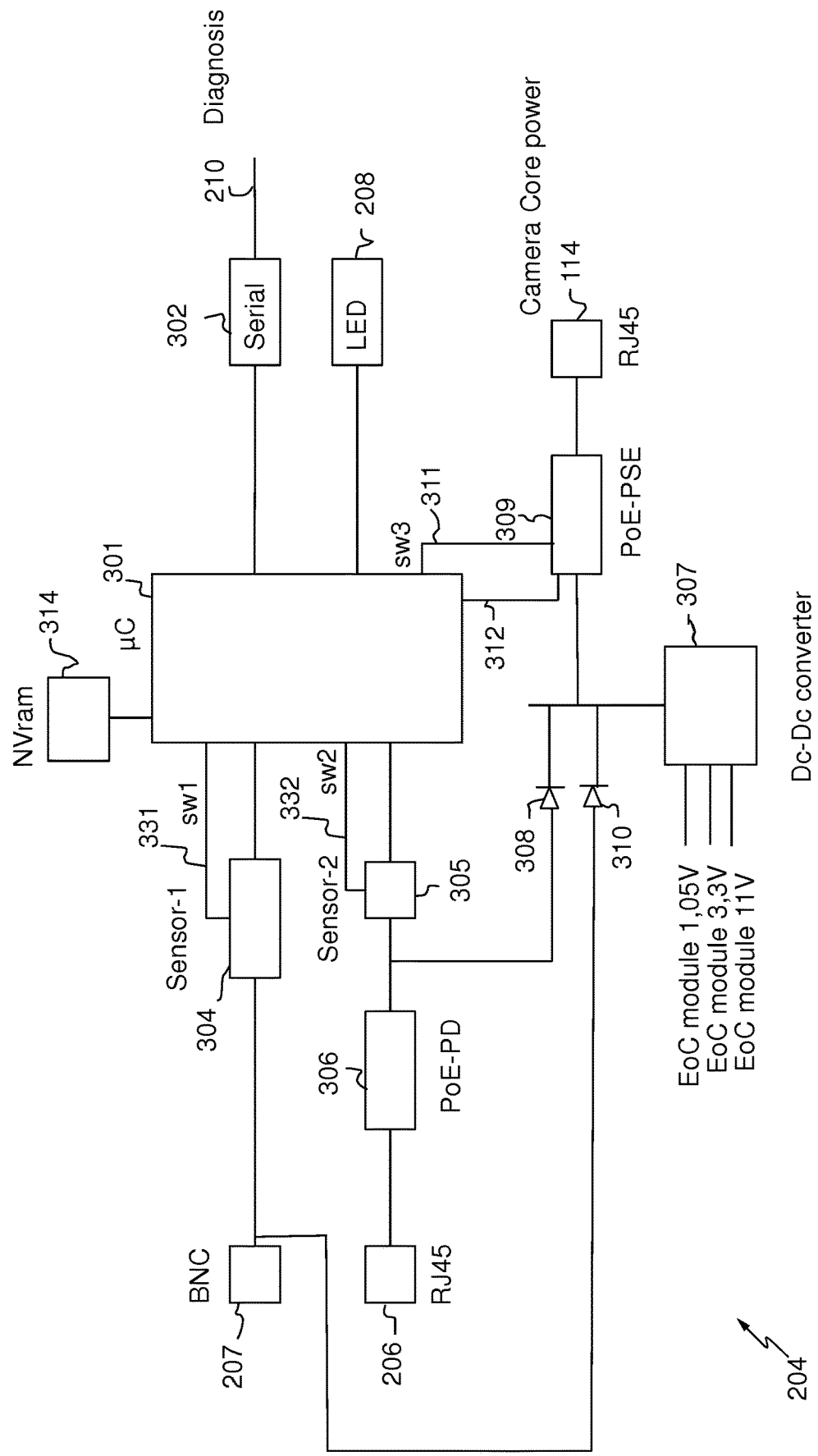

FIG. 3a illustrates in further detail the power management module 204 according to a first embodiment. According to an embodiment, this power management module 204 may be used in a terminal adapter according to the embodiment represented by FIG. 2a.

According to another embodiment, the power management module may be included in a PSE.

The power management module 204 comprises a first power sensor 304, a second power sensor 305, a first diode 310 and a second diode 308.

The first power sensor 304 is connected to a processor 301 by a connexion 331 through a first switch SW1. The processor 301 controls the first sensor 304 through the first switch SW1. The second power sensor 305 is connected to the processor by a connexion 332 through a second switch SW2. The processor 301 controls the second sensor 305 through the second switch SW2.

The processor 301 is configured to control and direct the execution of the instructions or portions of software code of the program or programs according to embodiments of the method for managing power that will be described with reference to FIGS. 4b, 5, 6, 7a, 7b and 8, which instructions are stored in storage means, such us a NVRAM circuit 314.

The power comes from the BNC port 207 and/or the RJ45 port 206 and is is delivered to the camera by using a PoE PSE ("Power over Ethernet Power Sourcing Equipment") circuit 309 under the control of the processor 301.

The PoE PSE circuit 309 comprises a connexion interface suitable for connecting the power management module 204 to the camera 114.

The PoE PSE circuit 309 is connected to the processor by a connexion 311 through a third switch SW3. The processor 301 controls the PoE PSE circuit 309 through the third switch SW3.

In particular, the power coming from the BNC port 207 goes through the first power sensor 304 and the first diode 310. Signals originating from the first power sensor 304 (described with reference to FIG. 4) are used by the processor 301 to estimate the power that the power management module 204 is able to supply to the camera 114 and to determine the available power delivered on the coaxial cable 106, 107, 108 by the PSE 102.

In the described embodiment, the first and second diodes 308, 310 combine respectively the power coming from the RJ45 port 206 and the BNC port 207 and the combination is fed to both a DC-DC converter 307 and the PoE PSE circuit 309.

The DC-DC converter 307 converts the PoE and/or PoC ("Power over Coax") input power voltage into the power needed by the terminal adapter 113. The voltages on PoE and PoC may be for example 56 V. The voltages needed by the terminal adapter 113 can be for example 11 volts, 1.3 volts and 1.05 volts.

In the described embodiment, the power coming from the RJ45 port 206 goes through a PoE PD ("Powered Device") front end circuit 306. Next, the power goes through the second power sensor 305 and the second diode 308. The power sensor 305 (described with reference to FIG. 4) is used by the processor 301 to estimate the power that the power management module 204 is able to supply to the camera 114 and to determine the available power delivered on the Ethernet cable connecting the terminal adapter 113 and the camera 114.

Thus, the power management module 204 comprises means for estimating a power that the power management module 204 is able to supply via the connexion interface.

The camera 114 is powered by means of the power sent through the second RJ45 port 212. The second RJ45 port 212 receives power from the PoE PSE ("Power Source Equipment") circuit 309. The PoE PSE circuit 309 receives power as a combination of the power delivered by the BNC port 207 (from the coaxial cable) through the first diode 310 and the power delivered by the first RJ45 port 206 through the second diode 308.

Figure 10:
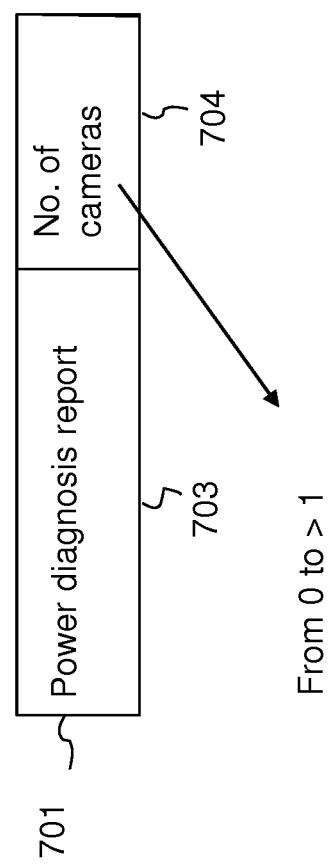
FIG. 10 describes the data packets that are exchanged between the power management module and a monitoring unit according to an embodiment.

In the described embodiment, the processor 301 communicates power diagnosis information (for example by sending a packet such as illustrated in FIG. 10) to the camera 114 by serial communication. In particular, the processor 301 is connected to a serial port 302 which is connected to the communication line 210.

The processor 301 drives the LEDs set 208 for power diagnosis feedback to the installer. The LEDs set 208 will be described with reference to FIG. 11.

A NVRAM circuit 314 is used by the processor 301 to store and retrieve configuration parameters and parameters used when implementing the method of managing power according to the invention.

Figure 3B:
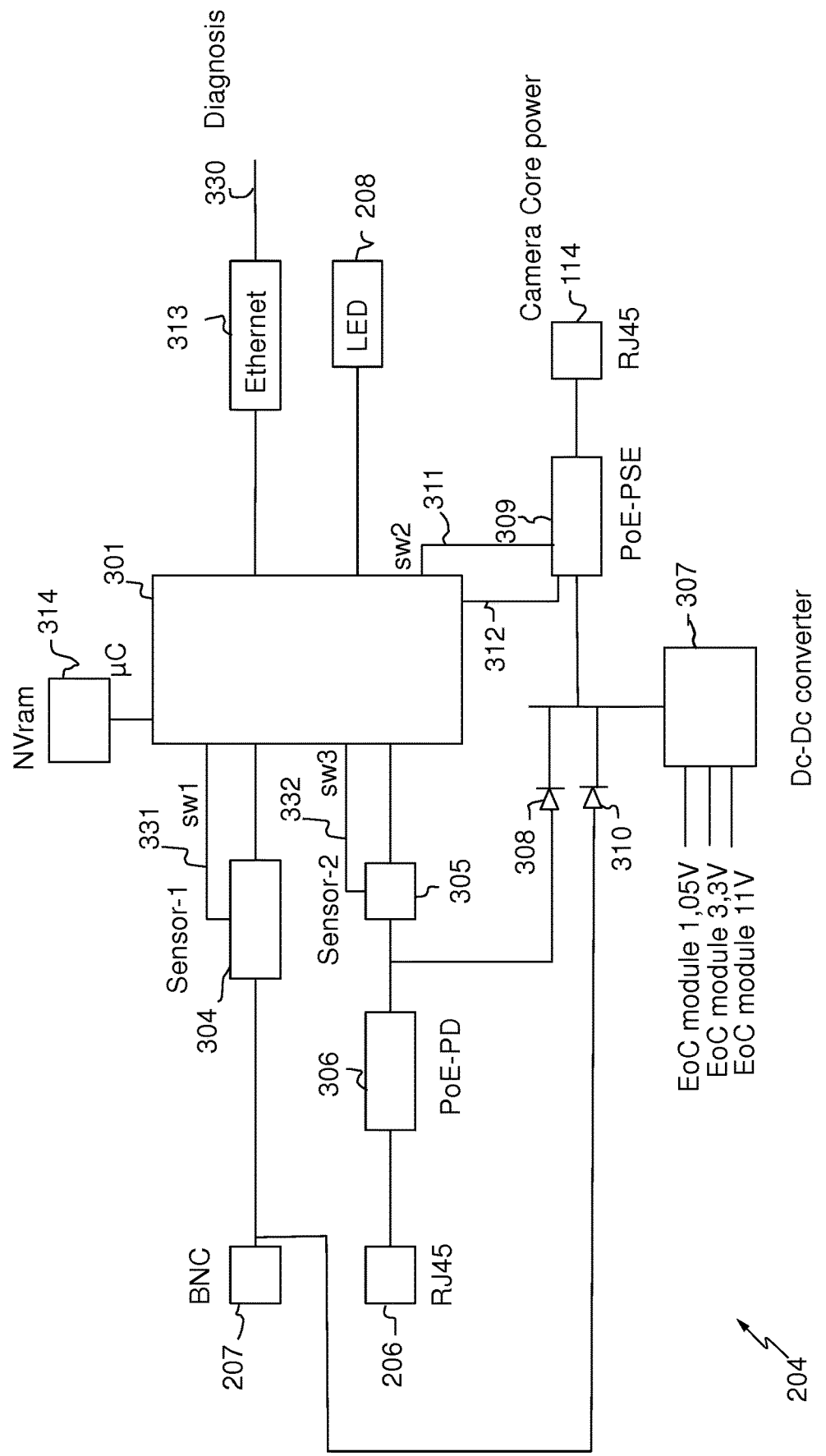
FIG. 3b represents a functional block diagram of the power management module of a terminal adapter according to the embodiment represented by FIG. 2b.

FIG. 3b illustrates in further detail the power management module 204 according to a second embodiment. According to an embodiment, this power management module 204 may be used in a terminal adapter according to the embodiment represented by FIG. 2b.

According to another embodiment, the power management module may be included in a PSE.

The power management module represented by FIG. 3b corresponds to the power management module represented by FIG. 3a wherein the serial port 302 has been replaced by an Ethernet port 313.

FIG. 4a illustrates a block diagram of a power sensor 304, 305 according to an embodiment.

Each power sensor 304, 305 comprises a first resistor 403 and a second resistor 402 that are mounted in parallel to the power source, the power source originating from the BNC port 207 and the PoE PD circuit 306 respectively. The value Ref1 of the first resistor 403 is for example 1 KΩ and the value Ref2 of the second resistor 402 is for example 100 KΩ. The power consumption of the second resistor 402 is considered negligible compared to both the power consumption of the first resistor 403 and power supply capability.

Each power sensor 304, 305 further comprises an Analogue to Digital Converter (ADC) 401.

The first switch SW1 404 (see FIGS. 3a and 3b) is connected between the first resistor 403 and the output of the power sensor 304, 305. The default state of the first power switch SW1 404 is "open".

The processor 301 controls the first power switch SW1 404 and reads the output of the ADC 401 for reading a numerical voltage value.

FIG. 4b illustrates a flow chart representing the prediction of a voltage drop (step 504 of FIG. 5) which would occur if the camera 114 is powered up according to a power class. The predicted voltage drop is used in the method for managing power represented by FIG. 5.

In the described embodiment, the processor 301 executes the steps described here below with reference to the flow chart of FIG. 4b.

For example, the method is performed when the processor 301 is started up and each time a diagnosis is requested by the installation tool 112 or by the camera 114.

During a step 410 the processor 301 opens the first power switch SW1 404. It may be noted that since the default state of the first power switch SW1 404 is "open", the execution of this step often produces no change.

Next, during a step 411, the processor 301 reads the output of the ADC 401 and receives a numerical voltage value $V_{ul}$ representing a voltage at the output of the power sensor when the first resistor 403 is not connected.

Once the numerical voltage value $V_{ul}$ has been received, the processor 301 closes the first power switch SW1 404 during a step 412.

Next, during a step 413 the processor 301 reads the output of the ADC 401 and receives a numerical voltage value $V_{ll}$ representing the voltage at the output of the power sensor when the first resistor 403 is connected.

Next, the processor 301 opens the first power switch SW1 403 during a step 414.

During the step 415 the processor 301 calculates the cable resistance by applying the following formulae:

$$R_{cable} = (V_{ul} - V_{ll}) / [\delta I_c - (V_{ll}/R_{ref1})]$$

$$\delta I_c = (P_{terminal}/V_{ll}) - (P_{terminal}/V_{ul})$$

Where $R_{cable}$ is the resistance of the cable 106, 107, 108, $R_{ref1}$ is the value of the first resistor 403, $V_{ul}$ and $V_{ll}$ are the voltages obtained in steps 411 and 413 and $P_{terminal}$ is the power consumption of the terminal adapter 113.

Next, during the step 416 the processor 301 calculates the power drop that would cause the start-up of the camera according to its PoE power class by applying the following formulae:

$$I_{limit} = \frac{(-Vdd - sqrt(Vdd2 - 4R_{cable}(P_{class} + P_{terminal})))}{2R_{cable}}$$

$$V_{limit} = (P_{class} + P_{terminal}) / I_{limit}$$

Where $V_{limit}$ is the predicted voltage at the camera 114 input, $R_{cable}$ is the value of the cable resistance previously calculated in 415, $P_{class}$ is the power consumption of the camera according to its PoE class and Vdd is the nominal voltage output of the PSE 102 (for example 56 volts).

It may be noted that the value of $P_{class}$ is obtained in step 501 which will be described with reference to FIG. 5.

Next, during a test step 417, the processor 301 checks if the power drop due to the addition a camera powered at the maximum power permitted by its power class, can be supported. For that, the processor 301 compares the voltage value obtained at step 416 ($V_{i\text{-}camera}$) and a threshold of minimum voltage $V_{min}$ according to the PoE protocol (its value is for example 36 V). $V_{min}$ may be initialized as a configuration parameter.

If $V_{i\text{-}camera}$ is greater than $V_{min}$ then camera i can be powered.

Figure 5:
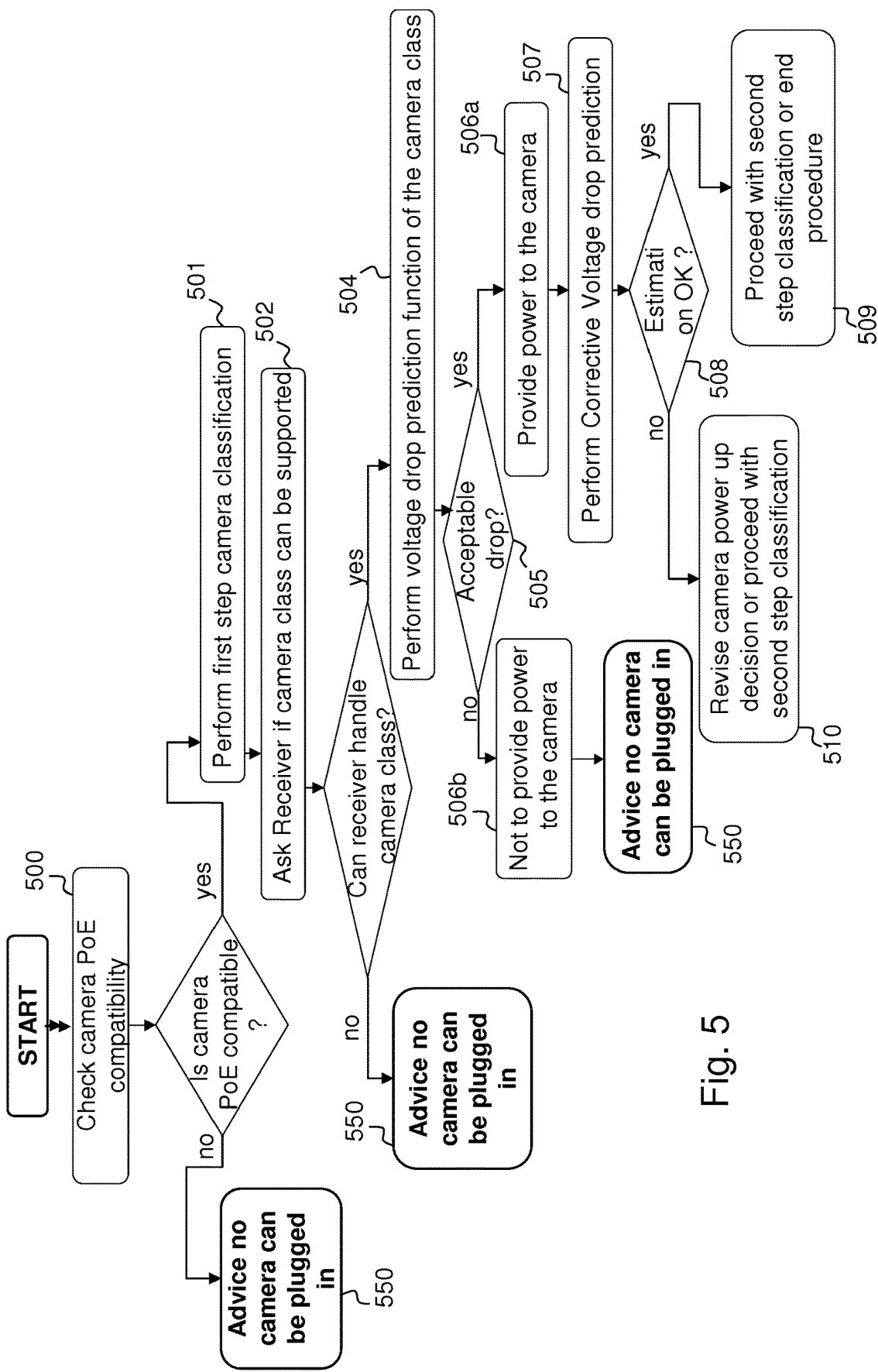
FIG. 5 illustrates a flow chart representing a method of managing power according to an embodiment.

FIG. 5 illustrates a flow chart representing a method for managing power according to an embodiment.

The steps illustrated by FIG. 5 are implemented by the processor 301 of the power management module 204, the power manger module 204 comprising means for implementing the method for managing power according to the invention.

During a verification step 500 the processor 301 checks compatibility of the camera 114 with PoE standards. This step 500 is performed by the PoE PSE circuit 309 and the result of the test is reported to the processor 301 through an interface 312 (FIGS. 3a and 3b).

If the camera 114 is compatible with PoE standards, the processor 301 implements during a step 501 a classification procedure (first step classification) to determine the power needed by the camera 114. The classification step 501 is performed by the PoE PSE circuit 309 and the power class of the camera is reported to the processor 301 through the interface 312.

It may be noted that to implement the verification step 500 and the classification step 501, the camera does not need to be powered-up.

If the camera is not compatible with PoE standards, the power management module 204 implements an advice step 550 for advising that the camera cannot be started-up.

Figure 9:
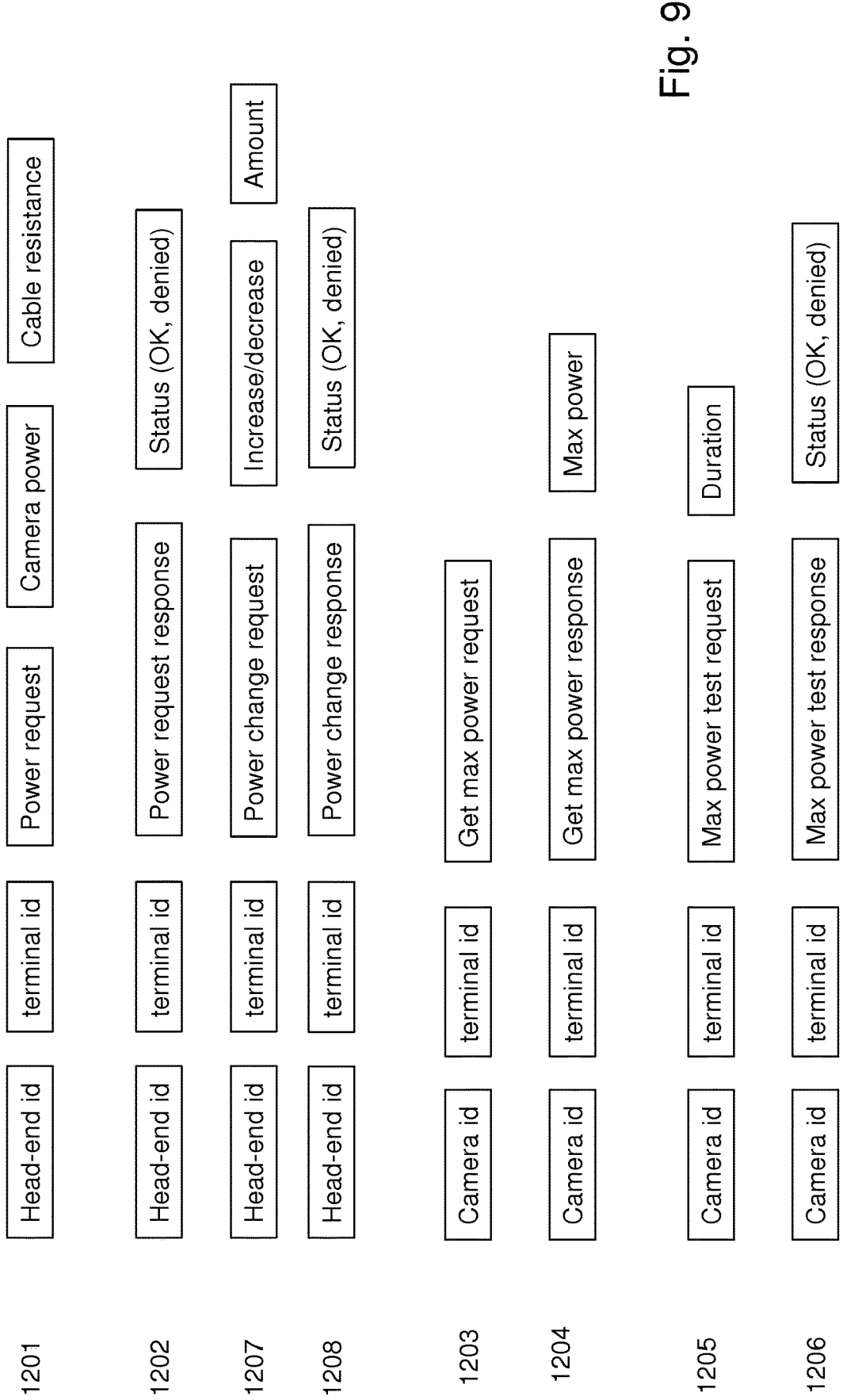
FIG. 9 describes the format of the messages exchanged between a central point, a terminal adapter and a camera according to an embodiment.

According to the described embodiment, once the processor 301 knows the camera power class, it sends a message to the PSE 102 to request a power budget to provide to the camera in order to know whether the PSE is able to deliver enough power to start-up the camera in a camera power class (message 1201 in FIG. 9). The messages exchanged in the system are described with reference to FIG. 9.

According to another embodiment wherein the processor does not have communication means to reach the PSE 102, the step 502 is skipped.

If the PSE 102 sends back to the processor 301, a power budget indication (message 1202 in FIG. 9) with enough power (i.e. the camera power class may be handled), then the processor 301 performs a voltage drop prediction in step 504. This step 504 is described with reference to FIG. 4b. As described with reference to FIG. 4b, the voltage drop prediction takes into account the resistance of the coaxial cable 106, 107, 108 and the camera power class.

Once the voltage drop has been predicted, the power that the power management module 204 is able to supply to the camera 114 may be estimated.

If the PSE 102 sends back to the processor 301, a power budget indication (message 1202 in FIG. 9) with insufficient power, the power management module 204 implement an advice step 550 for advising that the camera cannot be started-up.

The method for managing power further comprises negotiating, based on the estimated power that the power management module is able to supply, the start-up of the camera in a power class.

In the described embodiment, the power class of the camera is announced by the camera itself.

In particular, during a verification step 505 it is verified whether the predicted voltage drop is acceptable or not according the PoE standards.

If the predicted voltage drop is acceptable according to PoE standards, the terminal adapter 113 provides power to the camera 114 at a powering step 506a. In particular, the processor 301 instructs the PoE PSE circuit 309 through the connexion interface 312 to supply the power to the camera 114.

It may be noted that if the predicted voltage drop is acceptable according to PoE standards (i.e. it is lower than a predetermined value or threshold), the power sent by the PSE to the terminal adapter 113 is enough for starting-up the camera 114 in its power class. Thus, the camera 114 is started-up in its power class.

If the predicted voltage drop is not acceptable according to PoE standards, the power management module 204 goes to a step 506b wherein the power management module 204 does not provide power to the camera 114. Next, in the described embodiment, the power management module 204 implements an advice step 550 for advising that the camera cannot be started up.

Thus, negotiating the start-up of the camera comprises at step 505, based on the estimated power: to supply power to the camera (step 506a), or not to supply power to the camera (step 506b).

In particular, when the estimated power at step 505 is equal to or greater than a predetermined power, power is supplied to the camera (step 506a); and when the estimated power is lower than the predetermined power at step 505, power is not supplied to the camera (step 506b).

The predetermined power has a value associated with the power class of the camera.

Once the camera 114 has been started up, the terminal adapter 113 performs a step for correcting 507 the predicted voltage drop in order to determine an updated power that the power management module 204 is able to supply. The correcting step 507 is described with reference to FIG. 6. As will be described, the correcting step 507 is based on a measured voltage drop.

During a verification step 508, it is verified whether the prediction of voltage drop is correct or not.

If the prediction is correct and if both the camera 114 and the terminal adapter 113 support a two-step classification, the terminal adapter 113 proceeds with the second step classification at step 509. The step 509 is described with reference to FIG. 7a and the second step classification according to the PoE standards is described with reference to FIG. 8.

It may be noted that the second step classification (also known as data link layer classification) allows the PSE and the PD (camera) to negotiate the power with a finer resolution (0.1 watt step) than the classes. During the second step the PSE can dynamically reduce or increase the power allocated to the PD (camera).

If the prediction is correct and if both the camera 114 and the terminal adapter 113 do not support a two-step classification, the terminal adapter 113 continues supplying power to the camera 114.

Thus, if the prediction is correct, the voltage applied to the camera when supplying power will never be too low and the camera will never experience too high a current in its electronic circuits.

If the prediction is not correct and if the camera 114 or the terminal adapter 113 does not support the two step classification, the terminal adapter 113 does not supply power to the camera 114 if its prediction was too optimistic at step 510. Thus, the camera shuts down. The step 510 is described with reference to FIG. 7b.

Thus, damaging the camera with too high a current is avoided.

If the prediction is not correct and if both the terminal adapter 113 and the camera 114 support the two-step classification, the terminal adapter 113 proceeds with the second step classification with a revised power budget at step 510. The step 510 is described with reference to FIG. 7b.

It may be noted that standard PoE+ (802.3at) defines a two-step classification method. In a two-step classification method, a power source device (the terminal adapter in the described embodiment) provides power to the camera as the result of a first step even if the power source is not able to provide the power needed by the camera according to its power class. During the second step of the classification, the power source and the camera negotiate the amount of power to be provided by the power source to the camera.

Standard PoE (802.3af) defines a one-step classification method. In a one-step classification method a power sink device (PD, the camera in the described embodiment) advertises their power class to the power source device (PSE, the terminal adapter in the described embodiment), and the power source device takes the decision of powering-up the camera solely based on the camera power class.

Thus, either according to PoE standard or PoE+ standard, the start-up of the camera is negotiated based on said determined updated power, i.e. based on the result of the verification step 508, wherein it is verified whether the prediction of voltage drop is correct or not.

Thus, re-negotiating the start-up of the camera 114 comprises at step 508, based on the determined updated power, not to supply power to the camera 114, or to update the power budget allocated to the camera with the determined updated power, or to continue supplying the power to the camera 114.

It may be noted that the power budget allocated to the camera corresponds to the power allocated for starting-up the camera in its power class.

In particular, at step 508, the power management module 204 does not supply power to the camera 114 or the power budget allocated to the camera is updated with the determined updated power when the determined updated power is lower than the estimated power, and the power management module 204 continues supplying power to the camera 114 when the determined updated power is similar to the estimated power.

Figure 6:
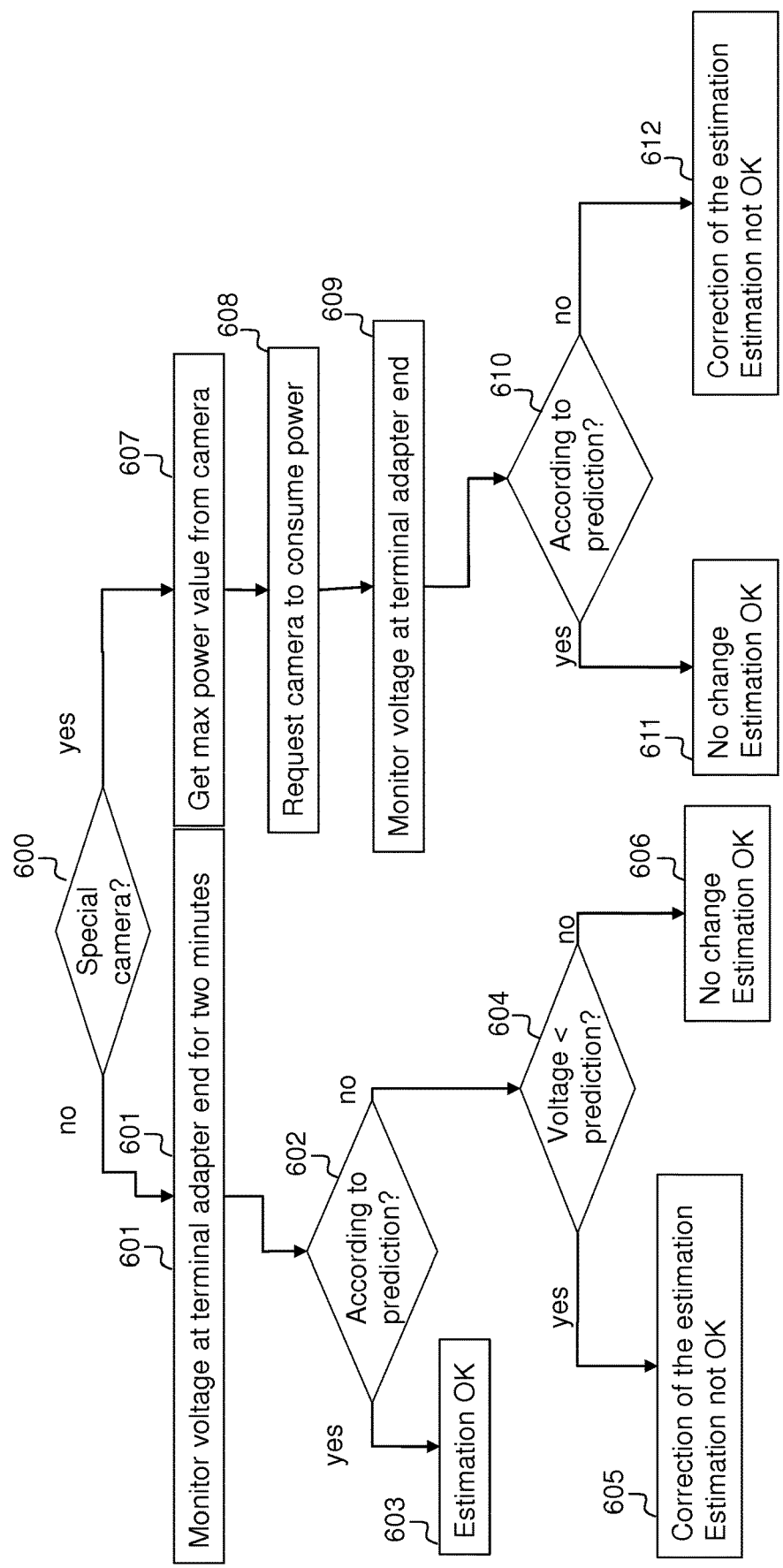
FIG. 6 illustrates a flow chart representing an example of implementation of step 507 of FIG. 5.

FIG. 6 illustrates the step for correcting 507 the predicted voltage drop of FIG. 5.

The correction of the predicted voltage drop comprises measuring the voltage at the output of the ADC 401 (FIG. 4a) when the camera 114 is started-up.

By comparing the predicted voltage drop with the measured voltage drop, it is known whether the predicted voltage drop is correct or not.

If the predicted voltage drop is correct, the measured voltage drop is equal to the predicted voltage drop $V_{limit}$ at step 416 when the camera is consuming power equal to its power class $I_{limit}$.

During a verification step 600 it is verified whether the camera is a special camera. A special camera has additional means to communicate its maximum power consumption (messages 1203, 1204 in FIG. 9) and to consume a maximum power on demand for a defined short period of time (messages 1205, 1206 in FIG. 9).

If the camera is not a special camera, the terminal adapter 113 is not sure that the camera consumes power at its power class $I_{limit}$.

It may be noted that most cameras perform an auto-test of all their functions at start-up. In general, the auto-test leads a camera to consume its maximum power during a short period during the start-up. In general, the start-up phase lasts between one to two minutes, and the auto-test lasts few seconds.

If at the verification step 600, it is decided that the camera is not a special camera, the terminal adapter 113 monitors at step 601 the voltage drop (by measuring the voltage at the output of the ADC 401) during a predetermined period of for example two minutes and compares the lowest voltage measured during this predetermined period to the predicted voltage drop $V_{limit}$.

Next, it is verified at step 602 whether the voltage measured is in accordance with the predicted voltage drop. If the lowest voltage measured is similar to the predicted voltage drop $V_{limit}$, it is decided that the voltage measured is in accordance with the predicted voltage drop 603. If at the verification step 602, the measured voltage is not in accordance with the predicted voltage drop, a step of comparison 604 is implemented wherein the lowest voltage measured is compared with the predicted voltage drop $V_{limit}$.

If the lowest measured voltage is lower than the predicted voltage drop $V_{limit}$, the terminal adapter 113 considers that the prediction of voltage drop was wrong and the predicted voltage drop is corrected at step 605. The correction of the predicted voltage drop will be described below.

If the lowest measured voltage is higher than the predicted voltage drop $V_{limit}$, the terminal adapter 113 considers that the prediction of voltage drop is correct 606. The terminal adapter 113 takes this decision since the camera may consume less power than the maximum allowed power associated with its power class.

If at the verification step 600, it is decided that the camera 114 is a special camera, the correction of the predicted voltage drop is implemented even when the measured voltage drop is higher than the predicted voltage drop.

When the camera 114 is a special one, the method comprises getting from the camera 114 the maximum consumed power at a step 607 and requesting the camera to consume a maximum power for a defined short period of time at step 608. When the camera consumes the maximum power, the voltage at the output of the ADC 401 is measured.

According to an example, the camera activates additional functionalities in order to consume the maximum power.

Next, at a verification step 610, it is verified whether the measured voltage is in accordance with the predicted voltage drop. When the response is positive, the terminal adapter 113 continues supplying the power to the camera.

If at the verification step 610, the measured voltage is not in accordance with the predicted voltage drop, the predicted voltage drop is corrected at step 612. It may be noted that steps 605 and 612 are similar.

At step 416 (FIG. 4b) for predicting the voltage drop, $I_{ilimt}$ ant $V_{limint}$ are obtained according to the following two equations:

$$I_{limit} = \frac{(-Vdd - sqrt(Vdd2 - 4R_{cable}(P_{class} + P_{terminal})))}{2R_{cable}}$$

$$V_{limit} = (P_{class} + P_{terminanl}) / I_{limit}$$

It may be noted that if the measured voltage drop is not equal to $V_{limit}$ (negative response at step 602 and step 612), the following parameters may be wrong:
- Vdd, since maybe the head-end adapter 102 is not exactly providing Vdd,
- $R_{cable}$, since maybe the Rcable calculation is not accurate, and
- Pclass, since maybe the camera maximum power consumption is lower than Pclass.

If the measured voltage drop is lower than $V_{limit}$, there is nearly no doubt about $P_{class}$ (only a non-standard camera would consume more than the allowed $P_{class}$). Thus the two parameters that may be modified are:
- Vdd since maybe the head-end adapter 102 is not exactly providing Vdd, and $R_{cable}$. It may be noted that the lower the resistance of the cable, the more it is difficult to accurately calculate the cable resistance.

According to an embodiment, the value of the resistance of the cable $R_{cable}$ is replaced by a second value $R_{cable2}$ such that the predicted voltage drop $V_{limit2}$ is equal to the measured voltage, where:

$$I_{limit2} = \frac{(-Vdd - sqrt(Vdd2 - 4R_{cable2}(Pclass + P_{terminal})))}{2Rcable2}$$

$$V_{limit2} = (P_{class} + P_{terminal})/I_{limit2}$$

When the measured voltage drop is greater than the predicted voltage drop $V_{limit}$, and the terminal adapter 113 does not have further information on the camera power consumption, the predicted voltage drop is not corrected.

When the measured voltage drop is greater than the predicted voltage drop $V_{limit}$, and maximum power consumption $P_{cam}$ of the camera when the voltage is measure is known, $I_{limit2}$ and $V_{limit2}$ are calculated by replacing $P_{class}$ by $P_{cam}$:

$$I_{limit2} = \frac{(-Vdd - sqrt(Vdd2 - 4R_{cable}(Pcam + P_{terminal})))}{2R_{cable}}$$

$$V_{limit2} = (P_{cam} + P_{terminal}/I_{limit2}$$

If the new predicted voltage drop $V_{limit2}$ is equal to the measured voltage drop, the predicted voltage drop is updated with the new predicted voltage drop $V_{limit\ 2}$.

If the new predicted voltage drop $V_{limit2}$ is different from the measured voltage drop the value of the resistance of the cable $R_{cable}$ is modified to $R_{cable2}$ such that the new predicted voltage drop $V_{limit3}$ is equal to the measured voltage where $$I_{limit3} = \frac{(-Vdd - sqrt(Vdd2 - 4R_{cable2}(P_{cam} + P_{terminal})))}{2R_{cable2}}$$

$$V_{limit3} = (P_{cam} + P_{terminal})/I_{limit3}$$

Thus, the value of the predicted voltage drop is updated.

FIGS. 7a and 7b represents a flow chart representing an example of implementation of steps 509 and 510 respectively of FIG. 5. These steps are implemented once the predicted voltage drop is corrected at step 507.

FIG. 7a describes steps implemented by the terminal adapter 113 when the prediction of the voltage drop is correct (step 509 of FIG. 5).

In a step 700, it is verified whether the camera supports a two-step classification.

If the camera 114 or the terminal adapter 113 does not support a two-step classification as defined by PoE standard, the decision taken when negotiating the start-up of the camera is not changed (step 701).

It may be noted that the terminal adapter 113 supports the two-step classification step if the processor 301 of the power management module 204 has an Ethernet port 313 connected to the Ethernet bridge 222 (FIGS. 2b and 3b). According to the PoE standard, the camera supports the two-step classification if it belongs to the PoE class 4.

If both the camera 114 and the terminal adapter 113 support the two-step classification, the processor 301 implements at step 702 the initialization of the second-step of classification according to the PoE standard.

In particular, the terminal adapter 113 initializes standard defined variables. A first variable PSEAllocatedPowerValue is initialized with the amount of power allocated to the camera 114, and a second variable PDRequestedPowerValue with the power requested by the camera 114 ($P_{class}$). Next, the second step of classification proceeds directly to the "Running" state 801 as described by the standard (described with reference to FIG. 8).

FIG. 7b describes steps implemented by the terminal adapter 113 when the prediction of voltage drop is wrong (step 510 of FIG. 5).

When the second-step of classification cannot be executed, the processor 301 checks whether the updated voltage drop prediction (at step 507) is lower than the level predefined by the PoE standards. If the updated voltage drop prediction is acceptable in a step 704, the decision that was taken when negotiating the start-up of the camera, is maintained (step 705).

If the updated voltage drop prediction is not acceptable in the step 704, the processor 301 shuts down the camera or stops supplying the camera at step 706.

It may be noted that even if a camera can work for some time with a low level of voltage (high level of current), a persistent high level of current is a serious cause of aging and long-term damage to the camera.

Thus, it is advantageous to stop powering the camera 113 when such a situation is detected.

If it is verified at step 703 that the two-step classification is possible, the processor 301 checks whether the voltage level from the updated voltage drop prediction is acceptable regarding the PoE standards. If the updated voltage drop is acceptable at step 707, the processor 301 implements at step 708 initialization of the second step of classification according to the PoE standards.

In particular, the terminal adapter 113 initializes two variables. A first variable $P_{camera}$ is initialized with the power requested by the camera 114 ($P_{class}$), and a second variable $P_{terminal}$ with the power allocated to the camera, here it is corresponding to the power requested by the camera 114 ($P_{class}$).

Next, the second step of classification proceeds at state "Initialize" 800 as described by the PoE standard (described with reference to FIG. 8).

If at step 707 the updated voltage drop prediction is lower than a predefined level, the terminal adapter 113 may command either not to supply power to the camera 114 (i.e. to power off the camera 114) or to negotiate a lower power budget with the camera 114.

It may be noted that according to the PoE standards, only class 4 cameras are able to negotiate power budget (i.e. the second step of classification is possible). However the standard allows class 4 cameras to be declared as class 3 during the first step of classification, then negotiate a higher power class than a power class 3 during the second step of classification.

So to keep compliancy with PoE standards, the terminal adapter (in particular the processor 301) cuts the power supply to a class 3 camera when it finds that the voltage is too low for maximum power class. If there is not enough power for class 3 the camera is not powered.

At a verification step 709, it is verified whether a camera 114 is a class 4 camera. If the camera is a class 4 camera, the processor 301 computes an acceptable power budget for the camera. Using the equations described with reference to FIG. 6, with a new resistance parameter, an updated power $P_{new}$ is determined at step 710 so that the voltage drop is equal to $V_{accept}$, $V_{accept}$ being the lowest level accepted by PoE standards.

$$I_{accept} = \frac{(-Vdd - sqrt(Vdd2 - 4R_{cable2}(P_{new} + P_{terminal})))}{2R_{cable2}}$$

$$V_{accept} = (P_{new} + P_{terminal}) / I_{accept}$$

Once the updated power has been determined, the processor 301 implements at step 711 the initialization of the second step of classification according to PoE standards. In particular, the processor 301 initializes two variables, a first variable $P_{camera}$ is initialize with the power requested by the camera 114 ($P_{class}$), and $P_{terminal}$ with the updated power as determined in 710. Note that $P_{camera}$ and $P_{terminal}$ are not equal so the processor 301 proceeds directly to a state "PSE Power review" 803 as will be described with reference to FIG. 8.

These features allow a quick adjustment of the camera power so that a state where the camera is consuming too high current is the shortest possible.

Figure 8:
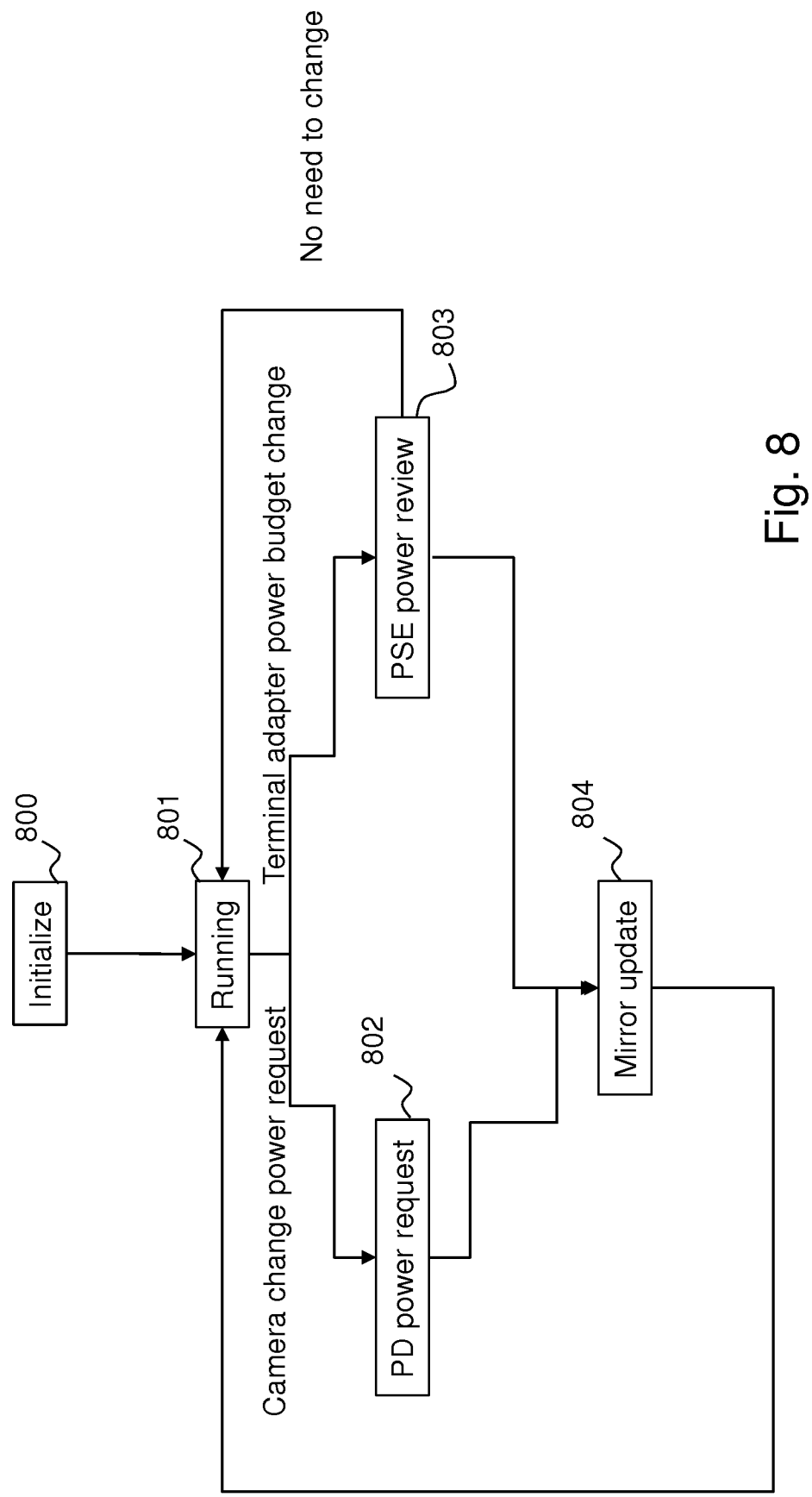
FIG. 8 describes the standard PSE state diagram of a second step classification.

FIG. 8 describes the standard PSE state diagram of a second step classification.

The second step of classification comprises an "Initialize" step 800 wherein the PSE (power source) sets internal variables. These internal variables mainly reflect the fact that the PSE and the PD (camera) have a synchronized understanding of the power allocated during the first step of classification.

This "initialize" step 800 corresponds to steps 702, 708 or 711 in FIG. 7*b*.

Next, in a "Running" state 801, the PSE monitors whether packets (LLDP packets) are received from the PD (camera) or an internal state change.

The packets from the PD (camera) may comprise a request of the camera for a power budget change. In general, an internal state change means that the PSU power budget has changed. An internal state change can be triggered both by observing a change of voltage below a defined threshold or by receiving a new power indication (1207 in FIG. 9) from the PSE 102.

Next, when the PSE 113 receives a new power request from the camera 113, the second step of classification goes to a "PD power request" state 802.

According to an embodiment, the PSE will process this request by sending a power allocation request (1201 in FIG. 9) to the PSE 102. If an "OK status" is received (1202 in FIG. 9) from the PSE 102, a new voltage drop prediction is performed, based on the power budget requested by the camera 114.

If the predicted voltage drop is acceptable, the camera 114 request is accepted according to the standard. According to the PSE standards, if the request cannot be accepted, the terminal adapter 113 responds to the camera 114 with the original power budget.

The PSE 113 goes to the "PSE power review" state 803 if an internal state change is detected.

In this state 803, the terminal adapter 113 implements a new voltage drop prediction based on the newly available power budget.

According to the PoE standards, if the new predicted voltage drop is acceptable, the new power budget is notified to the camera 114. On the contrary, if the new power budget cannot be accepted, the terminal adapter 113 responds to the camera 114 with the original power budget.

Next, the terminal adapter 113 responds (message 1208) to the PSE 102 by sending a message (1208 in FIG. 9) comprising a status representing the success or the failure of delivering the new budget to the camera 114.

According to the PoE standards, if the power budget is not changed, the terminal adapter 113 goes back to the "Running" state 801.

The second step of classification further comprises a "Mirror update" state 804, wherein according to an embodiment, the terminal adapter 113 implements a correction of the predicted voltage drop as described in FIG. 6. If the prediction is correct, the terminal adapter 113 goes back to the "Running" state 801. If the prediction is wrong, i.e. the correction results in a power budget change, the terminal adapter 113 goes to the "PSE power review" state 803 to modify the power value.

FIG. 9 describes formats of messages exchanged between a central point of the network (PSE or head-end adapter or EOC Receiver 102), a terminal adapter 113 and a camera 114 according to an embodiment.

The processor 301 of the terminal adapter 113 sends a message 1201 to the PSE 102 in order to request power for an associated camera 114. This message comprises:
- a "Head end id" field identifying the PSE 102,
- a "Terminal id" field identifying the terminal adapter 113,
- a "Power request" field identifying the request,
- a "Camera power" field representing the requested amount of power, and
- a "Cable resistance" field in case the PSE 102 takes into account the power dissipated in the cable 106, 107, 108.

The PSE 102 sends a message 1202 to the terminal adapter 113 as a response for a power request. This message 1202 comprises:
- a "Head end id" field identifying the head end adapter 102,
- a "Terminal id" field identifying the terminal adapter 102
- a "Power request" field identifying the response
- a "Status" OK field indicating either a successful allocation ("Status" OK) or a failed allocation ("Status" denied).

The head end adapter 102 sends a message 1207 to the terminal adapter 113 for a change in the allocated power. The message 1207 comprises:
- a "Head end id" field identifying the PSE 102,
- a "Terminal id" field identifying the terminal adapter 113,
- a "Power request" field identifying the request,
- an "Increase" or "decrease" field indicating respectively an increased power budget and a decreased power budget, and
- An "Amount" field indicating the amount by which the power is changed.

The terminal adapter 113 sends a message 1208 to the head end adapter 102 to respond to the power change request 1107. The message 1208 comprises:
- a "Head end id" field identifying the PSE 102,
- a "Terminal id" field identifying the terminal adapter 113,
- a "Power change request response" field identifying the response, and
- a "Status" filed indicating that either the new budget have successfully applied ("Status" OK), or the new budget cannot be applied ("Status" denied).

The terminal adapter 113 sends a message 1203 to the camera 114 to get the camera 114 max power information. The message 1203 comprises:
- a "Camera id" field identifying the camera 114,
- a "Terminal id" field identifying the terminal adapter 113, and
- a "Get max power request" field identifying the request.

The camera sends a message 1204 to the terminal adapter, the message 1204 comprising:
- a "Camera id" field identifying the camera 114,
- a "Terminal id" field identifying the terminal adapter 113,
- a "Get max power response" field identifying the response,
- a "Max power" field representing information about de maximum power consumed by the camera 113.

The terminal adapter 113 sends a message 1205 to the camera 113. The message 1205 comprises:
- a "Camera id" field identifying the camera 114,
- a "Terminal id" field identifying the terminal adapter 113,
- a "Max power test request" field identifying the request, and
- a "Duration" field containing a time duration during which the camera consumes its maximum power.

The camera sends a message 1206 to the terminal adapter, the message 1206 comprising:
- a "Camera id" field identifying the camera 114,
- a "Terminal id" field identifying the terminal adapter 113,
- a "Max power test response" field identifying the response, and
- a "Status" field indicating that either the camera 114 will execute the request ("Status" OK) or the camera 114 cannot perform the request ("Status" Denied).

FIG. 10 describes data packets that are exchanged between the processor 301 and a monitoring unit for power diagnosis information exchange.

The data packets are also exchanged between the processor 301 and the monitoring unit through the serial line 211 for the embodiment of terminal adapter 113 described with reference to FIG. 2a.

Further, the data packets are exchanged between the processor 301 and the monitoring unit through the Ethernet port 210 for the embodiment of terminal adapter 113 described with reference to FIG. 2b.

According to embodiments, the "monitoring unit" refers to either the camera 113, the installation tool 112, the PSE 102 or the VMS 104.

A power diagnosis report packet 701 is sent by the processor 301 to the monitoring unit. The power diagnosis report packet 701 is used by the processor 301 to report the result of the power diagnosis to the monitoring unit.

A power diagnosis report packet 701 comprises a function field 703 initialized to "Power diagnosis report", a number of cameras field 704 initialized to whatever is the number of additional cameras (including the current one) that can be plugged into the coaxial cable 106, 107, 108.

The number of cameras may be 0 when the predicted voltage is too low, 1 when the predicted voltage is acceptable or more than 1 when the predicted voltage is high.

Figure 11:
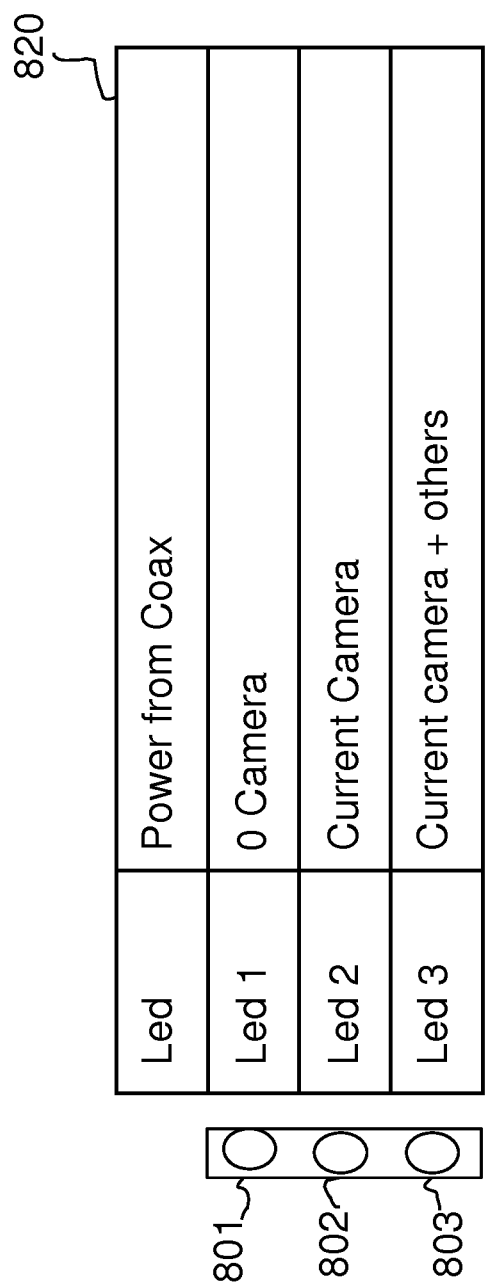
FIG. 11 illustrates an embodiment of implementation of a LED block.

FIG. 11 represents an example of implementation of the LED block 208. This example is only given for clarity reasons, other implementations comprising a different number of LEDs with states binary encoded, or flashing or using multiple colours can be considered.

The table 820 summarizes the meaning of each LED as follows:

A first LED 801 indicates that the power provided on the coaxial port or BNC port 207 is too low to power the camera (predicted voltage drop is too low).

A second LED 802 indicates that the power provided on the coaxial port or BNC port 207 is enough to power the camera (predicted voltage drop is at an acceptable level).

A third LED 803 indicates that that the power provided on the coaxial port or BNC port 207 is enough to power the camera and to daisy chain further cameras (predicted voltage drop is high).

Figure 12:
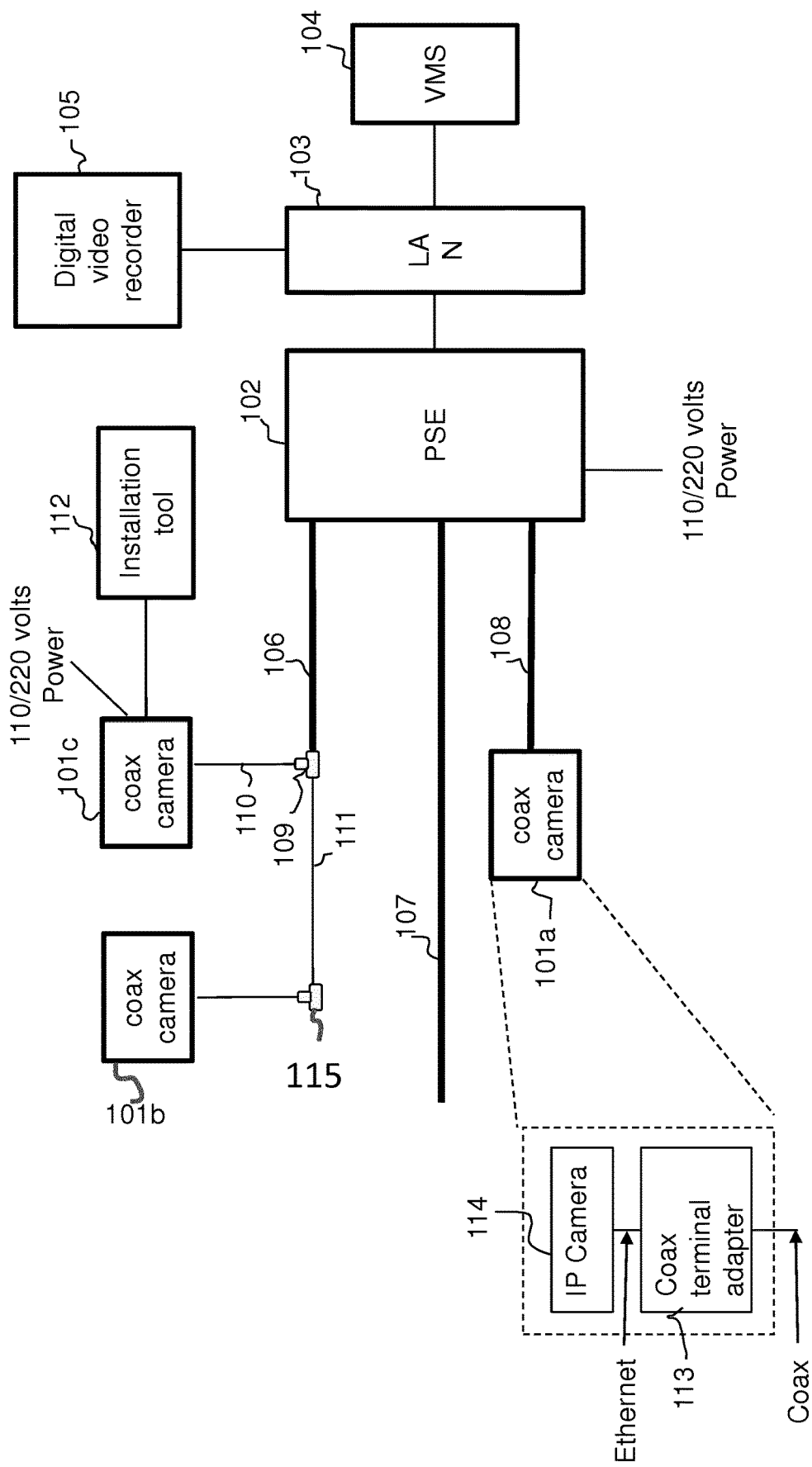
FIG. 12 represents an alternative functional description of a typical video surveillance system as targeted by the invention.

FIG. 12 schematically illustrates alternative embodiments of an IP over Coax video surveillance system. This figure represents the embodiments represented by FIG. 1 to which a third type of camera 101c is added For example, a first camera 101a is directly connected to a first coaxial cable 108, a second camera 101b is connected to a second coaxial cable 106 by a T-style connector 115 and a third camera 101c is connected to the second coaxial cable 106 by a T-style connector 109. In the represented example, one camera 101a is connected to a first cable 108 and one camera 101b is connected to a second cable 106. The cameras 101a, 101b have been described with reference to the FIG. 2. The third camera 101c will be described with reference to FIGS. 13a and 13b.

According to these embodiments, the third camera 101c may receive power from an external power source (not illustrated). Indeed when a IP Coax camera is used to replace a former analog camera it is likely that the power source which was used to power the analog camera is still available. It may be noted that the third camera 101c may receive power from the PSE and from the external power source.

Otherwise, the description given with reference to FIG. 1 applies to the system represented by Figure.

Two embodiments of a terminal adapter 113 adapted to the camera 101 are described with reference to FIGS. 13a and 13b.

Figure 13A:
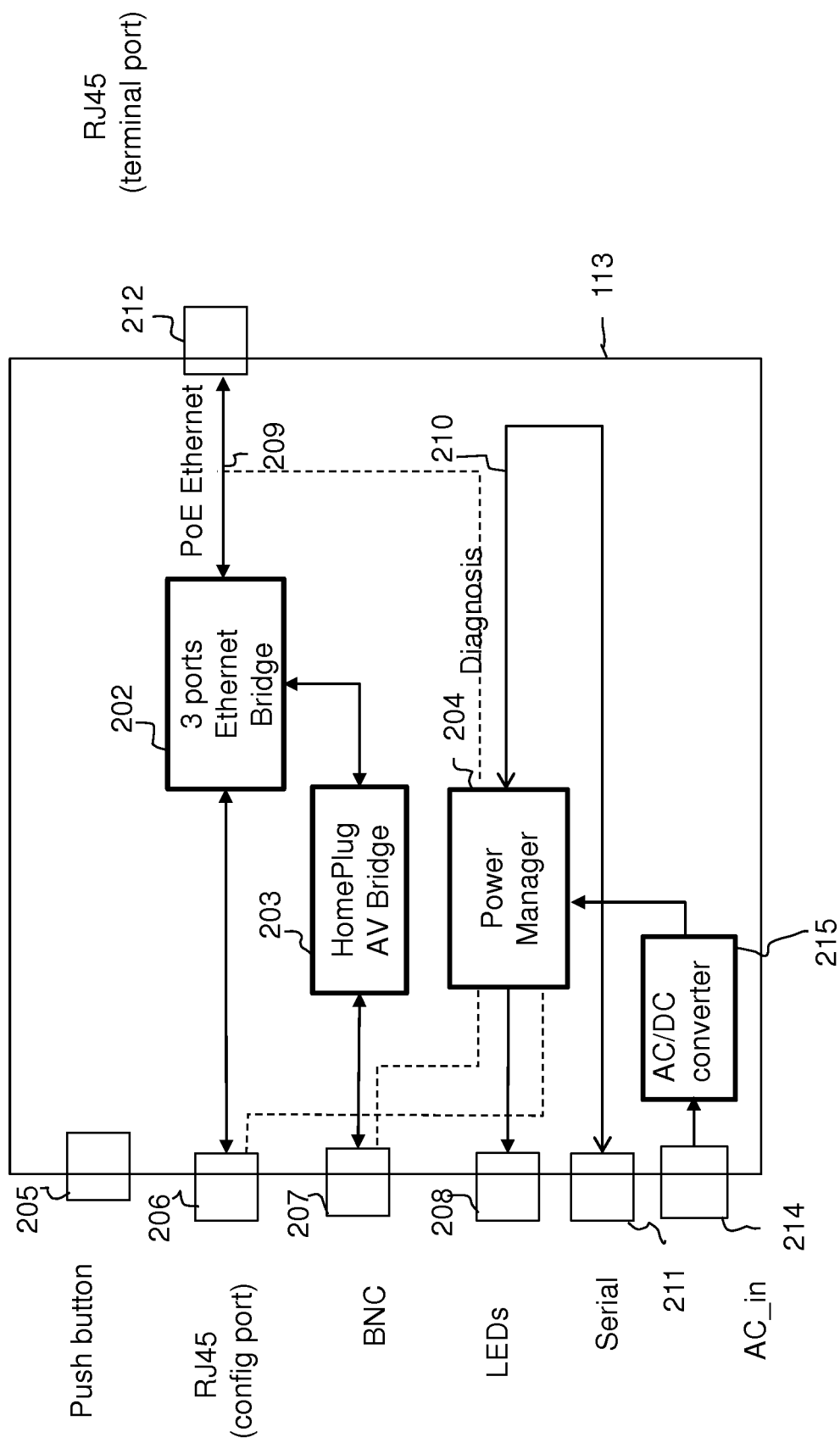
FIGS. 13a et 13b represent respectively a functional block diagram of a terminal adapter according to one embodiment.

A third embodiment of a terminal adapter is represented by FIG. 13a. The terminal adapter represented by FIG. 13a is similar to the one represented by FIG. 2a.

The terminal adapter 103 represented by FIG. 13a further comprises an AC power-in connector 214. The AC power (for example 220 volt, 50 Hz) is converted into DC power by an AC/DC converter 215 (for example 220 volt AC to 56 volts DC). The resulting DC power is delivered to the power manager 204.

Except for the above differences, the description given with reference to FIG. 2a applies to the terminal adapter represented by FIG. 13a.

Figure 13B:
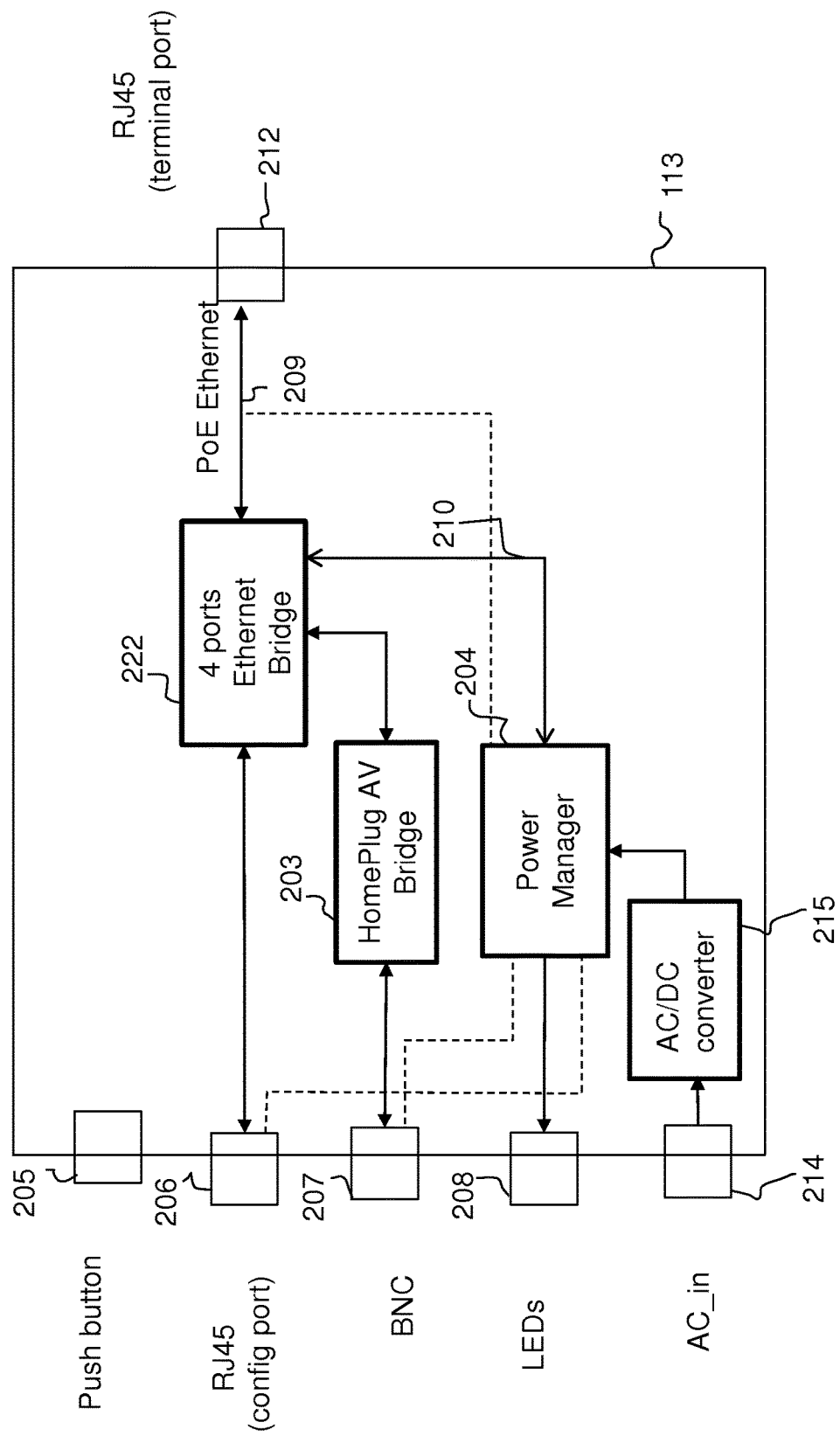

A terminal adapter 113 according to a forth embodiment is represented by FIG. 13b. The terminal adapter represented by FIG. 13b is similar to the one represented by FIG. 2b.

The terminal adapter represented by FIG. 13b further comprises a AC power-in connector 214. The AC power (for example 220 volt, 50 Hz) is converted into DC power by an AC/DC converter 215 (for example 220 volt AC to 56 volts DC). The resulting DC power is delivered to the power manager 204.

Except for the above differences, the description given with reference to FIG. 2b applies to the terminal adapter represented by FIG. 13b.

Figure 14A:
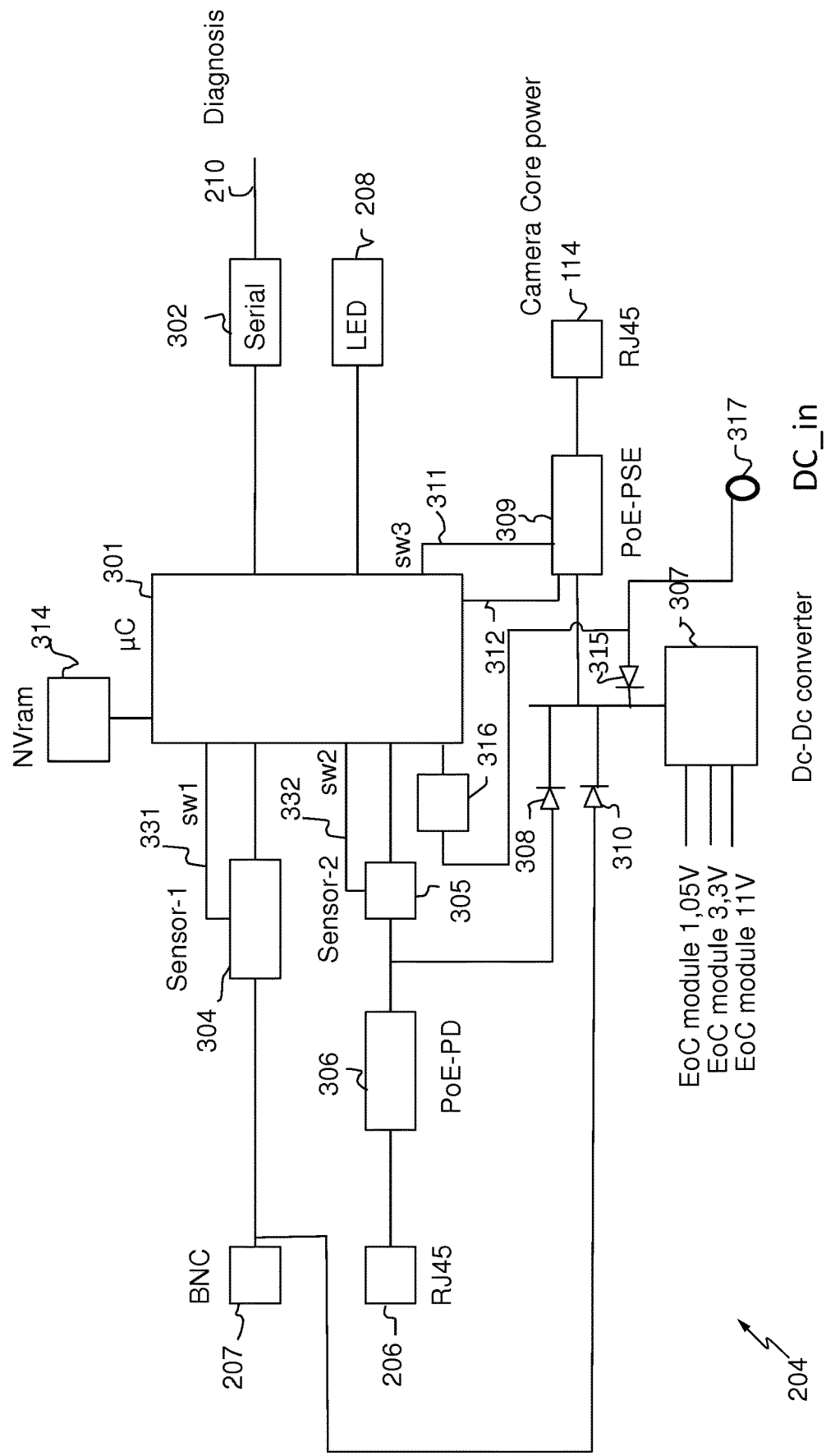

FIG. 14a illustrates in further detail the power management module 204 according to a third embodiment. According to an embodiment, this power management module 204 may be used in a terminal adapter according to the embodiment represented by FIG. 13a.

According to another embodiment, the power management module may be included in a PSE.

The power management module 204 comprises a first power sensor 304, a second power sensor 305, a third power sensor 316, a first diode 310, a second diode 308 and a third diode 315.

The power comes from the BNC port 207 and/or the RJ45 port 206 and/or the AC/DC converter 215 via an interface 317. The power is delivered to the camera by using a PoE PSE ("Power over Ethernet Power Sourcing Equipment") circuit 309 under the control of the processor 301.

The presence of power from the AC/DC converter may be checked by the processor 301 through the third power sensor 316.

Thus, the power management module 204 further comprises means for detecting the presence of an external power source available for providing power. In particular, the power originating from the external power source is provided to the camera 114.

Otherwise the power management module of FIG. 14a is similar to the power management module described in FIG. 3a.

Figure 14B:
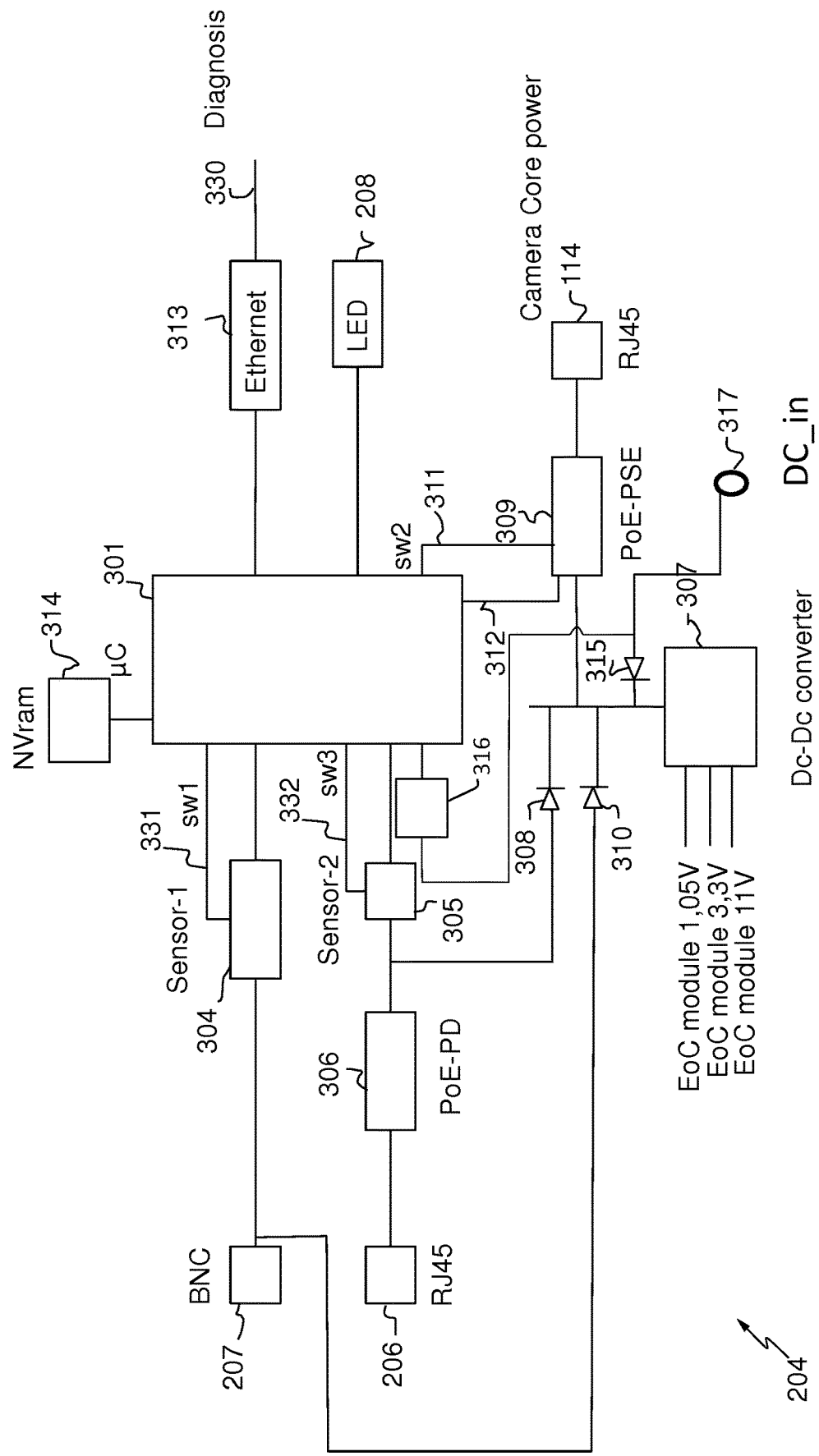
FIG. 14b represents a functional block diagram of the power management module of a terminal adapter according to the embodiment represented by FIG. 13b.

FIG. 14b illustrates in further detail the power management module 204 according to a forth embodiment. According to an embodiment, this power management module 204 may be used in a terminal adapter according to the embodiment represented by FIG. 13b.

According to another embodiment, the power management module may be included in a PSE.

The power management module 204 comprises a first power sensor 304, a second power sensor 305, a third power sensor 316, a first diode 310, a second diode 308 and a third diode 315.

The power comes from the BNC port 207 and/or the RJ45 port 206 and/or the AC/DC converter 215 via an interface 317. The power is delivered to the camera by using a PoE PSE ("Power over Ethernet Power Sourcing Equipment") circuit 309 under the control of the processor 301.

The presence of power from the AC/DC converter can be tested by the processor 301 through the third power sensor 316.

Otherwise the power management module of FIG. 14b is similar to the power management module described in FIG. 3b.

As for the power management module 204 described with reference to FIG. 14a, the power management module 204 further comprises means for detecting the presence of an external power source available for providing power. In particular, the power originating from the external power source is provided to the camera 114.

Figure 15:
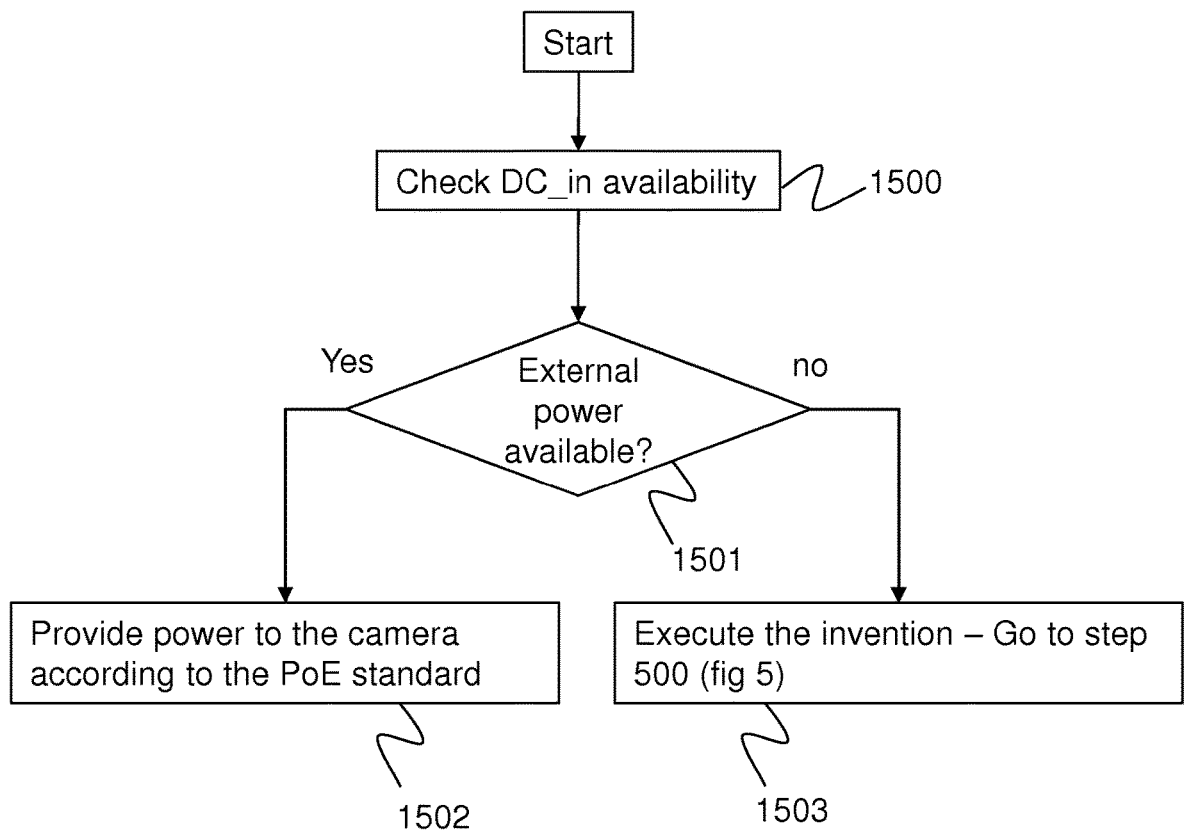
FIG. 15 illustrates a flow chart representing steps of the method for managing power according to an embodiment.

FIG. 15 illustrates a flow chart representing steps of a method for managing power according to an embodiment.

The steps illustrated by FIG. 15 are implemented by the processor 301 of the power management module 204 represented by FIGS. 14a and 14b, the power management module 204 comprising means for implementing the method for managing power according to embodiments of the invention.

At a checking step 1500 the processor 301 checks the availability of an external power source. According to an embodiment, the availability of an external power source is implemented by reading the output of the third power sensor 316.

If the presence of an external power source is detected, at a step 1502 the power management module 204, according to a standard PoE power supply, provides power to the camera 114.

If the presence of an external power source is not detected, the power supplied to the camera 114 comes through the Coax cable 106. Thus, at a step 1503 the processor 301 goes to step 500 of FIG. 5 and implements the method for managing power as detailed by FIGS. 5, 6, 7 and 8.

The invention claimed is:

1. Power management module for managing power supply from a power sourcing equipment item to an associated apparatus, comprising:
   a connexion interface suitable for connecting said power management module to the associated apparatus;
   a processor configured to:
   estimate a power that the power management module is able to supply via the connexion interface;
   negotiate, based on the power estimated, the start-up of the associated apparatus in a power class, for negotiating the processor is further configured to supply power via the connexion interface;
   determine an updated power that the power management module is able to supply, when power is supplied to the associated apparatus; and
   re-negotiate the start-up of the associated apparatus based on the determined updated power,
   wherein estimating a power comprises predicting a voltage drop at the power management module based on the power class of the associated apparatus and on a voltage drop occurring between the power sourcing equipment and the connexion interface.

2. Power management module according to claim 1, wherein for negotiating the start-up of the associated apparatus, the processor is further configured, based on the estimated power:
   to supply power to the associated apparatus, or
   not to supply power to the associated apparatus.

3. Power management module according to claim 1, wherein, for re-negotiating the start-up of the apparatus, the processor is further configured to, based on the determined updated power, not to supplying power to the associated apparatus, or update power allocated for starting-up the associated apparatus with the determined updated power, or to continue supplying power to the associated apparatus.

4. Power management module according to claim 1, wherein for determining an updated power, the processor is further configured to measure a voltage drop occurring between the power source and the connexion interface once the estimated power is supplied to the apparatus.

5. Power management module according to claim 1, the processor is further configured to request power to the power source equipment, in order to starting-up the associated apparatus in a power class.

6. Power management module according to claim 1, wherein for determining an updated power, the processor is further configured to measure a voltage drop occurring when power is supplied to the associated apparatus.

7. Power management module according to claim 1, the processor is further configured to detect the presence of an external power source available for providing power.

8. Adapter device associated with an apparatus, comprising a power management module according to claim 1.

9. Camera device comprising an adapter device according to claim 8, the camera device being the apparatus associated with the adapter device.

10. System comprising a plurality of camera devices and a plurality of adapter devices, each camera device being associated with an adapter device, wherein each adapter device comprises a power management module according to claim 1 for managing power supply to an associated camera device from a power source in a power over data network, the network being a video surveillance network.

11. Method for managing power supply from a power source equipment item to an associated apparatus, the method comprising:

estimating a power that a power management module is able to supply via a connexion interface;

negotiating, based on the estimated power, the start-up of an apparatus in a power class, said negotiating comprising supplying or not supplying power to the associated apparatus via the connexion interface;

determining an updated power that said power management module is able to supply, when power is supplied via the connexion interface; and re-negotiating the start-up of the apparatus based on said determined updated power wherein estimating a power comprises predicting a voltage drop at the power management module based on the power class of the apparatus associated with the power management module and on a voltage drop between the power sourcing equipment and the connexion interface.

12. Method for managing power according to claim 11, wherein negotiating the start-up of the associated apparatus comprises, based on the estimated power:

supplying power to the associated apparatus, or not supplying power to the associated apparatus.

13. Method for managing power according to claim 11, wherein re-negotiating the start-up of the apparatus comprises, based on the determined updated power:

not supplying power to the associated apparatus, or updating power allocated for starting-up the associated apparatus with the determined updated power, or to continuing supplying power to the associated apparatus.

14. Method for managing power according to claim 11, wherein determining an updated power comprises measuring a voltage drop between the power sourcing equipment and the connexion interface when power is supplied to the associated apparatus.

15. Method for managing power according to claim 11, further comprising requesting power from the power sourcing equipment, in order to start-up the associated apparatus in a power class.

16. Method for managing power according to claim 11, wherein determining an updated power comprises measuring a voltage drop occurring at the power management module when power is supplied to the associated apparatus.

17. Method for managing power according to claim 11, further comprising detecting the presence of an external power source available for providing power.

18. A non-transitory computer-readable storage medium storing instructions of a computer program for implementing a method for managing power according to claim 11.

* * * * *